United States Patent
Kaneshige et al.

[11] Patent Number: 5,913,010
[45] Date of Patent: Jun. 15, 1999

[54] INFORMATION STORAGE MEDIUM, RECORDING METHOD USED THEREFOR, AND REPRODUCING APPARATUS

[75] Inventors: Toshihiko Kaneshige, Yokohama; Sigeru Todokoro, Fujisawa; Tadashi Kojima, Yokohama, all of Japan

[73] Assignee: Kabushiki Kaisha Toshiba, Kawasaki, Japan

[21] Appl. No.: 08/780,432

[22] Filed: Jan. 7, 1997

[30] Foreign Application Priority Data

Jan. 8, 1996 [JP] Japan .................... 8-000986

[51] Int. Cl.⁶ ............................ H04N 5/91
[52] U.S. Cl. .................. 386/70; 386/98; 386/108; 386/125
[58] Field of Search ............ 386/6, 7, 45, 68, 386/69, 70, 92, 95, 108, 109, 111, 112, 125, 126, 98; 360/72.1, 72.2; 369/32

[56] References Cited

U.S. PATENT DOCUMENTS 5,434,678 7/1995 Abecassis .................... 358/342
5,630,006 5/1997 Hirayama et al. ............. 386/92

FOREIGN PATENT DOCUMENTS

| 6-96559 | 4/1994 | Japan . |
| 7-129624 | 5/1995 | Japan . |
| 7-334939 | 12/1995 | Japan . |
| 8-263969 | 10/1996 | Japan . |
| 8-273304 | 10/1996 | Japan . |
| 724989 | 11/1996 | Japan . |
| 8-339664 | 12/1996 | Japan . |
| 8-339665 | 12/1996 | Japan . |
| 289818 | 11/1996 | Taiwan . |
| 95-12197 | 5/1995 | WIPO . |
| 95-12275 | 5/1995 | WIPO . |
| 95/12197 | 5/1995 | WIPO . |

*Primary Examiner*—Andrew I. Faile
*Assistant Examiner*—Christopher Onuaku
*Attorney, Agent, or Firm*—Cushman Darby & Cushman; IP Group of Pillsbury; Madison & Sutro LLP

[57] ABSTRACT

Data on multiple stories or scenes are recorded on a recording medium so as to reduce the physical distance moved by a pickup at playback time and to suppress breaks or disturbances in reproduced video. A multi-scene program having a plurality of optionally selectable branch stories B0, B1, B2, B3, etc., is recorded between a branch point X and a connection point Y. The preceding main story of a video program, made up of video, sound, text and the like, branches off at branch point X to the branch stories, and at connection point Y connects to the succeeding main story in the video program. The recorded state between the branch point X and the connection point Y is such that the branch stories are each divided into multiple cells and the cells of the respective branch stories are recorded time-division multiplexed.

8 Claims, 36 Drawing Sheets

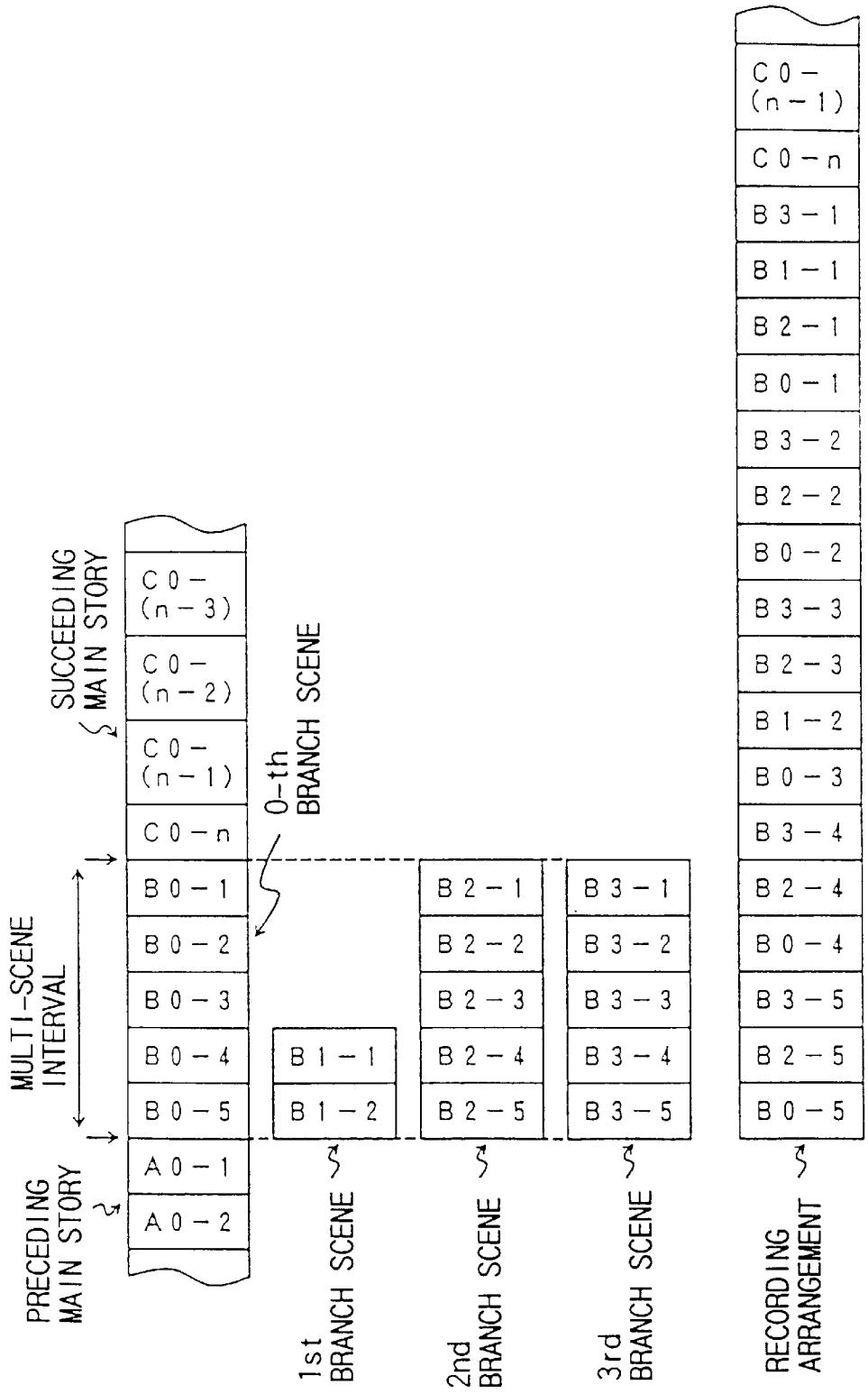

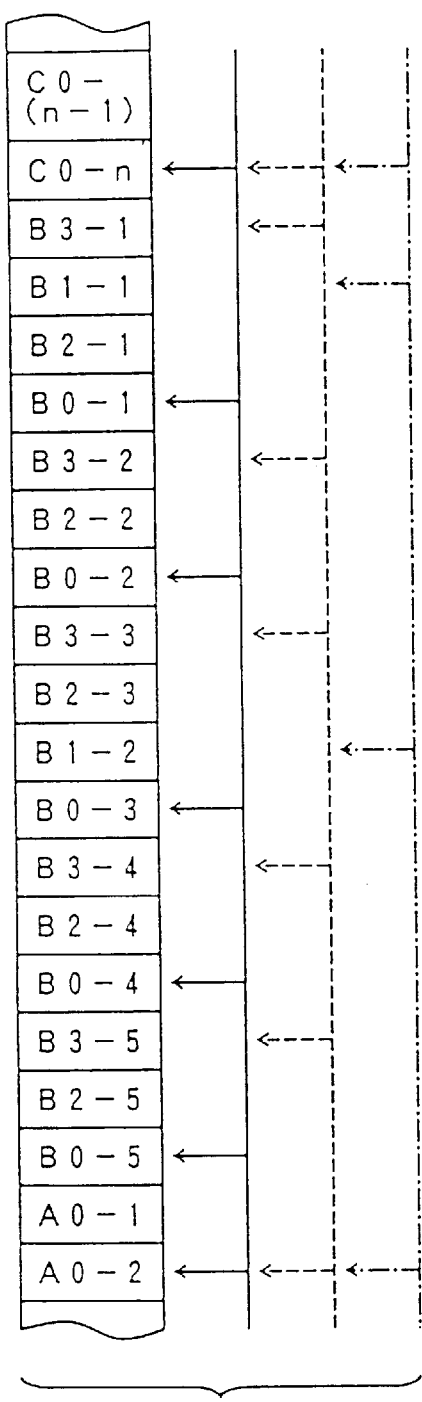
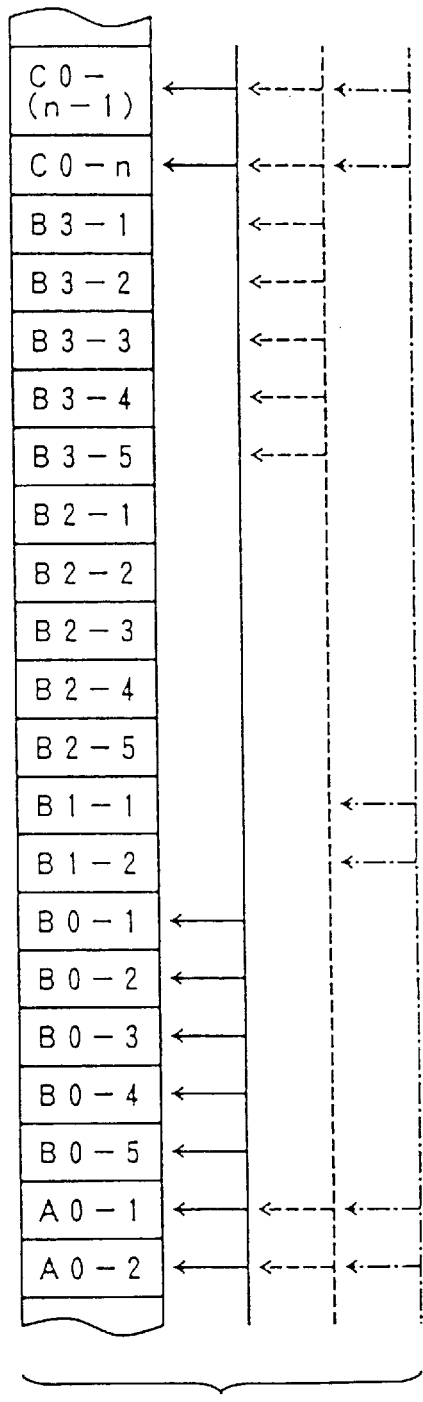
FIG. 2A
FIG. 2B

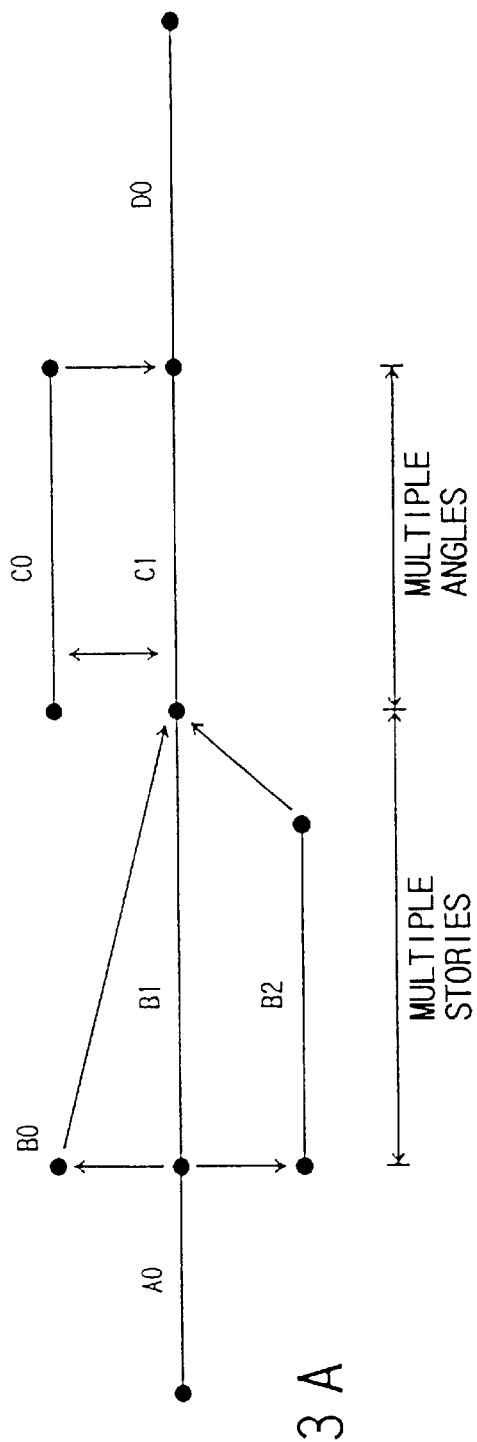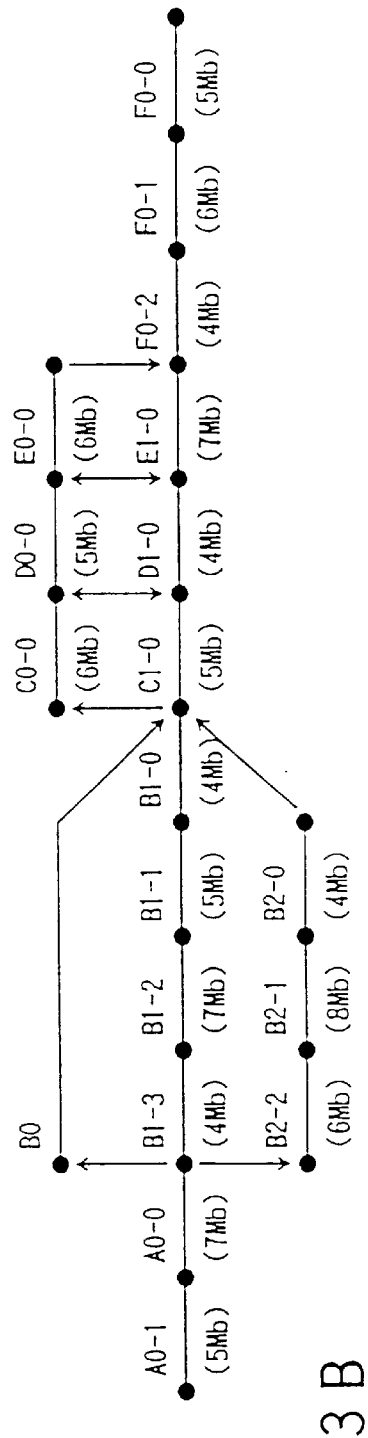
FIG. 3A
FIG. 3B

| SCENE CELL NUMBER | DATA CAPACITY (Mb) | SCENE CELL NUMBER TO WHICH CONNECTION IS SET UP | | |
|---|---|---|---|---|
| A0-1 | 5 | A0-0 | | |
| A0-0 | 7 | B1-3 | B2-2 | C0-0 |
| B1-3 | 4 | B1-2 | | |
| B1-2 | 7 | B1-1 | | |
| B1-1 | 5 | B1-0 | | |
| B1-0 | 4 | C0-0 | C1-0 | |
| B2-2 | 6 | B2-1 | | |
| B2-1 | 8 | B2-0 | | |
| B2-0 | 4 | C0-0 | | |
| C0-0 | 6 | D0-0 | C1-0 | |
| C1-0 | 5 | D0-0 | D1-0 | |
| D0-0 | 6 | E0-0 | D1-0 | |
| D1-0 | 5 | E0-0 | E1-0 | |
| E0-0 | 4 | F0-2 | E1-0 | |
| E1-0 | 7 | F0-2 | | |
| F0-2 | 4 | F0-1 | | |
| F0-1 | 6 | F0-0 | | |
| F0-0 | 5 | | | |

| SCENE CELL NUMBER | DATA CAPACITY (Mb) | CONNECTION COMPLETION FLAG |
|---|---|---|
| A0-1 | 5 | 1 |
| A0-0 | 7 | 1 |
| B1-3 | 4 | 1 |
| B2-2 | 6 | 1 |
| C0-0 | 6 | 1 |
| C1-0 | 5 | 1 |
| B1-2 | 7 | 1 |
| B2-1 | 8 | 1 |
| B1-1 | 5 | 1 |
| D0-0 | 4 | 1 |
| D1-0 | 4 | 1 |
| B2-0 | 4 | 1 |
| B1-0 | 4 | 1 |
| C0-0 | 6 | 1 |
| C1-0 | 5 | 1 |
| E0-0 | 6 | 1 |
| E1-0 | 7 | 1 |
| F0-2 | 4 | 1 |
| F0-1 | 6 | 1 |
| F0-0 | 5 | 0 |

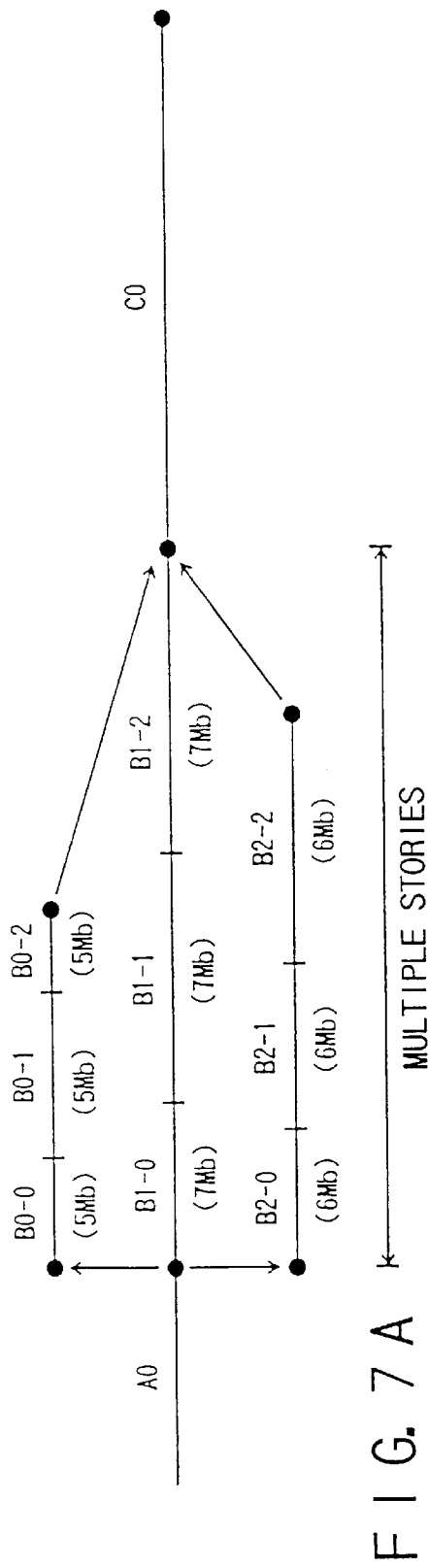
F I G. 7A
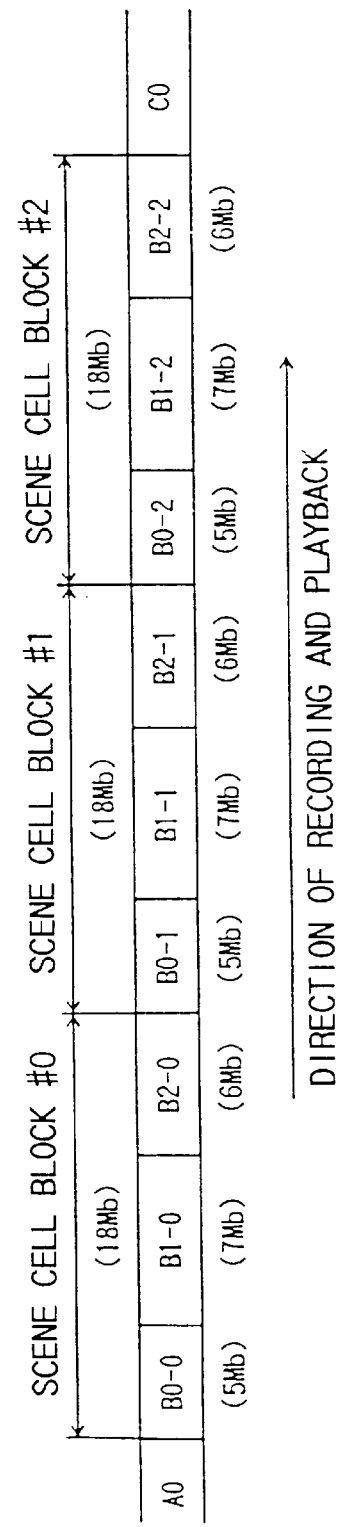
F I G. 7B

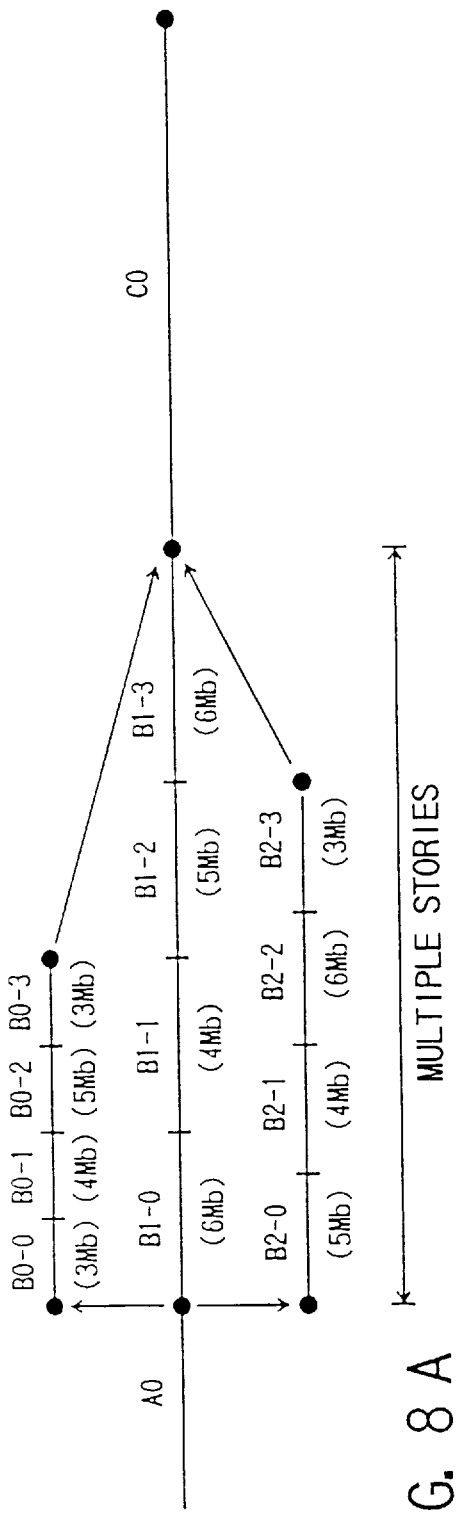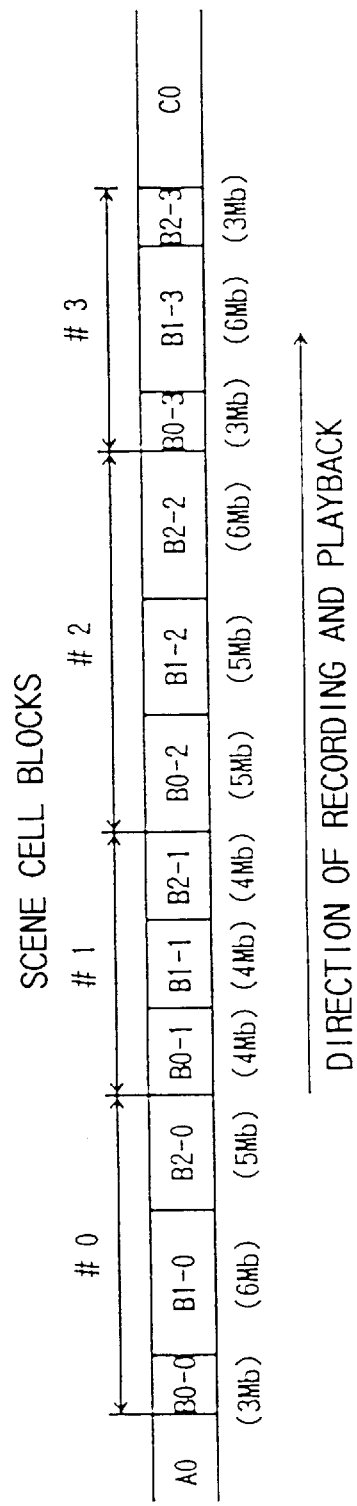
FIG. 8A
FIG. 8B

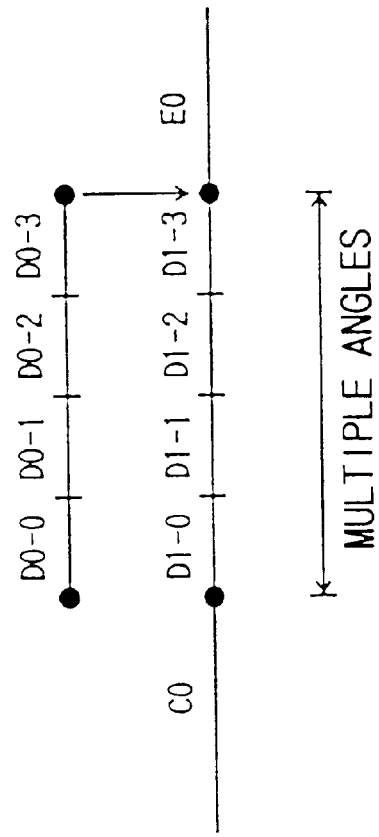
F I G. 9A
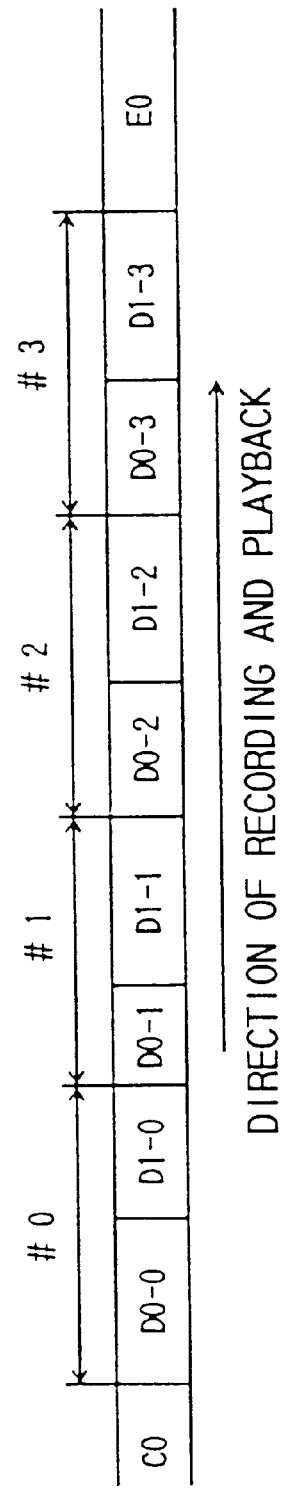
F I G. 9B

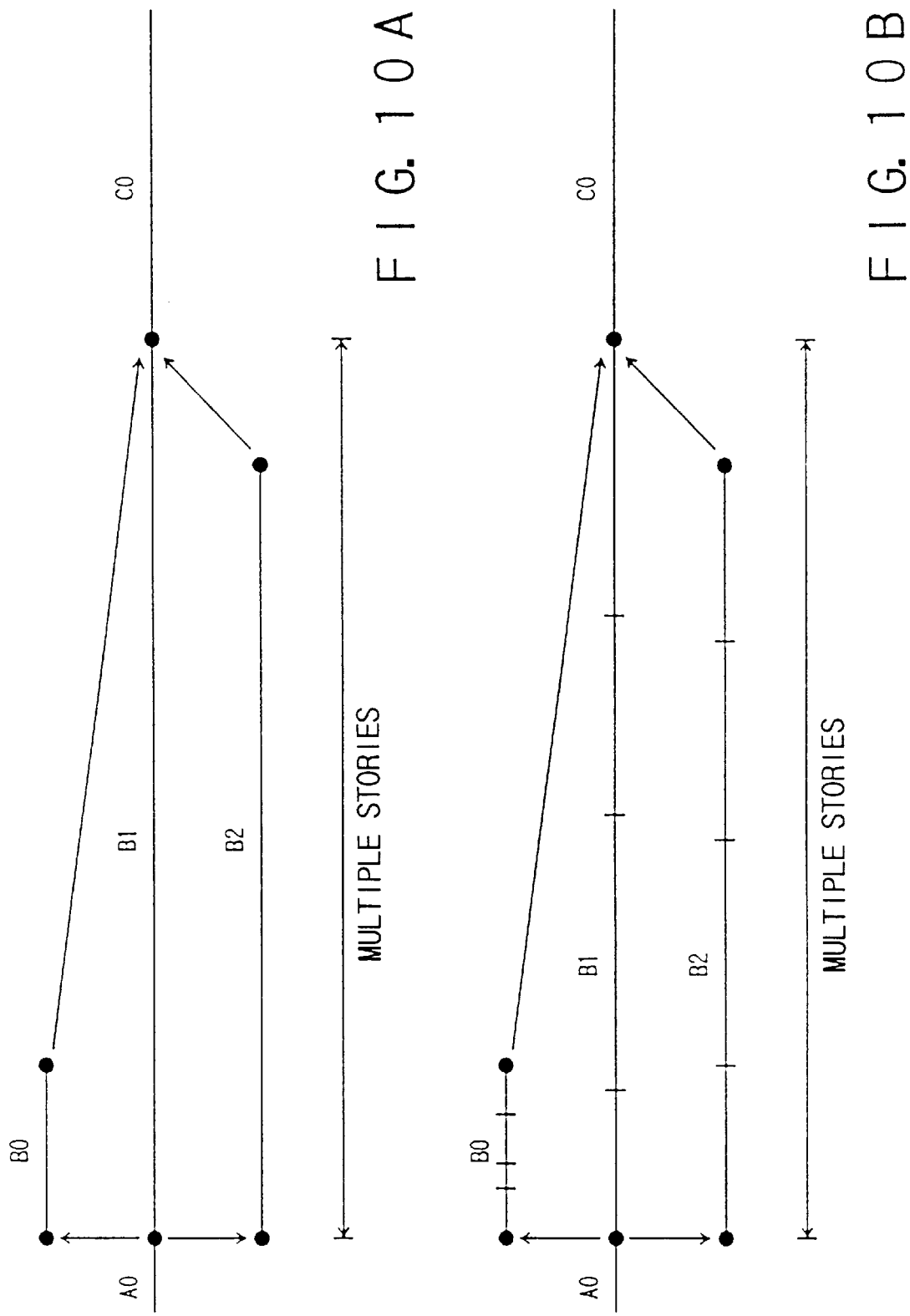

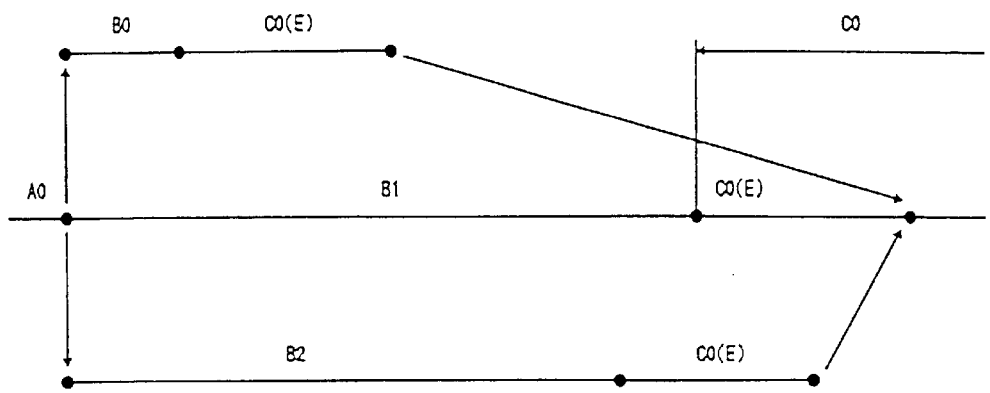
F I G. 11A
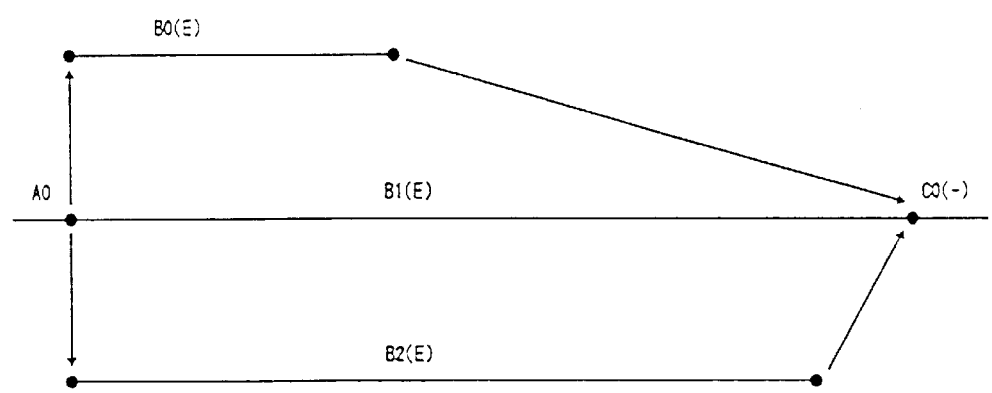
F I G. 11B
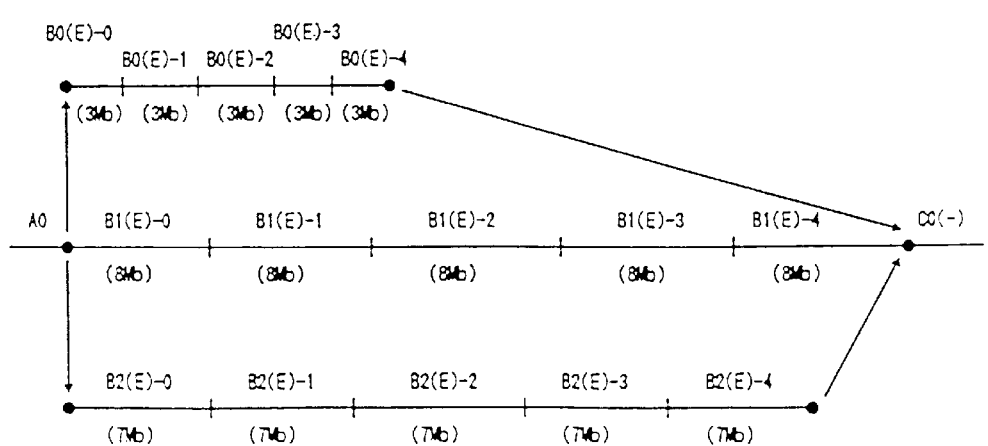
F I G. 11C

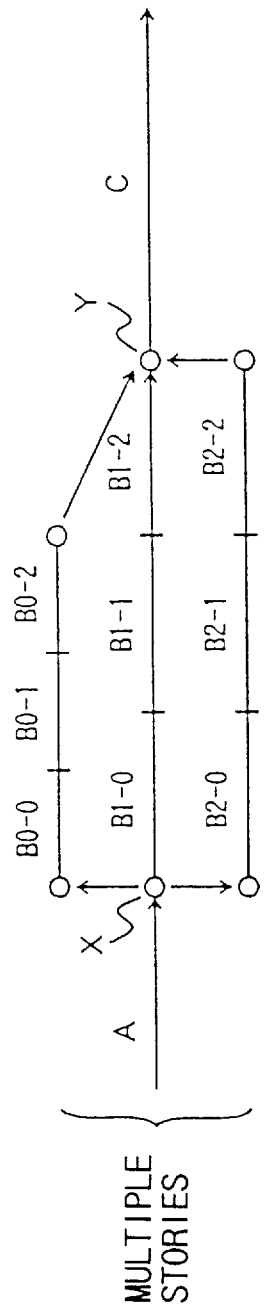
F I G. 13A  MULTIPLE STORIES
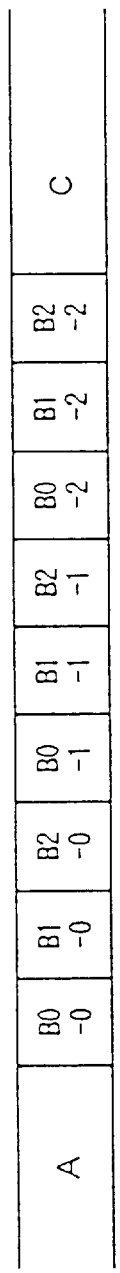
F I G. 13B  ARRANGEMENT ON RECORDING LINE
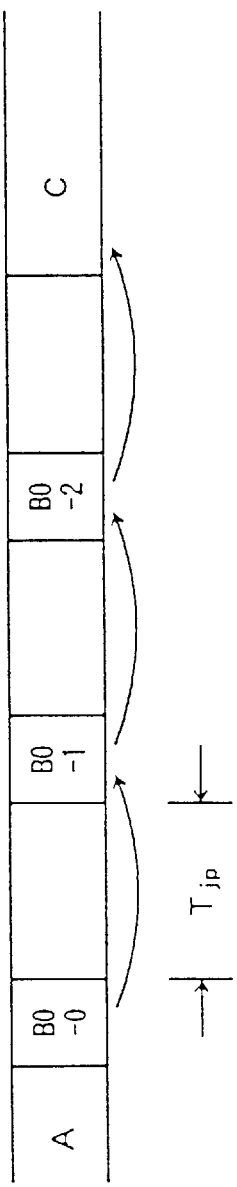
F I G. 13C  B0 SELECTED

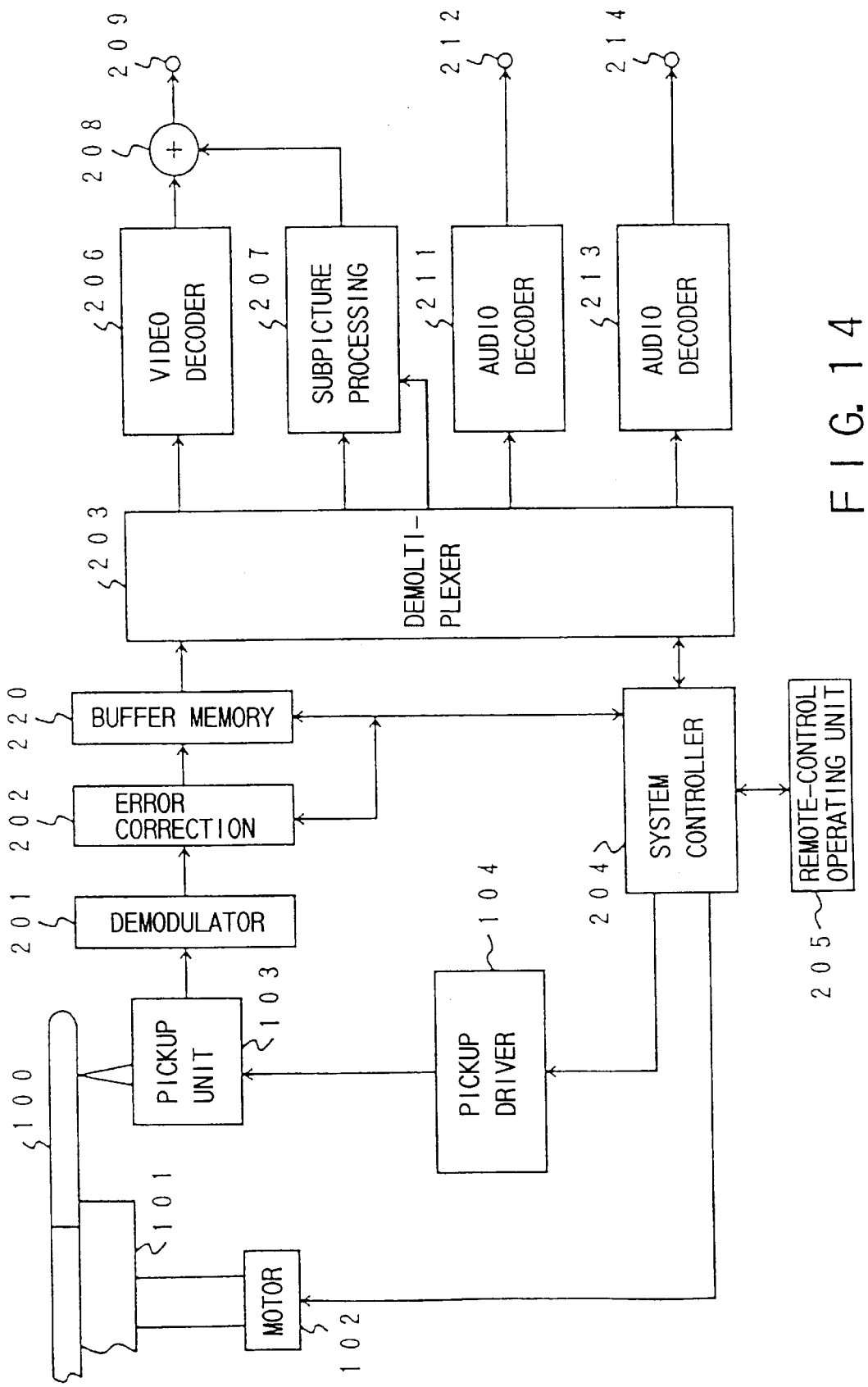
F I G. 1 4

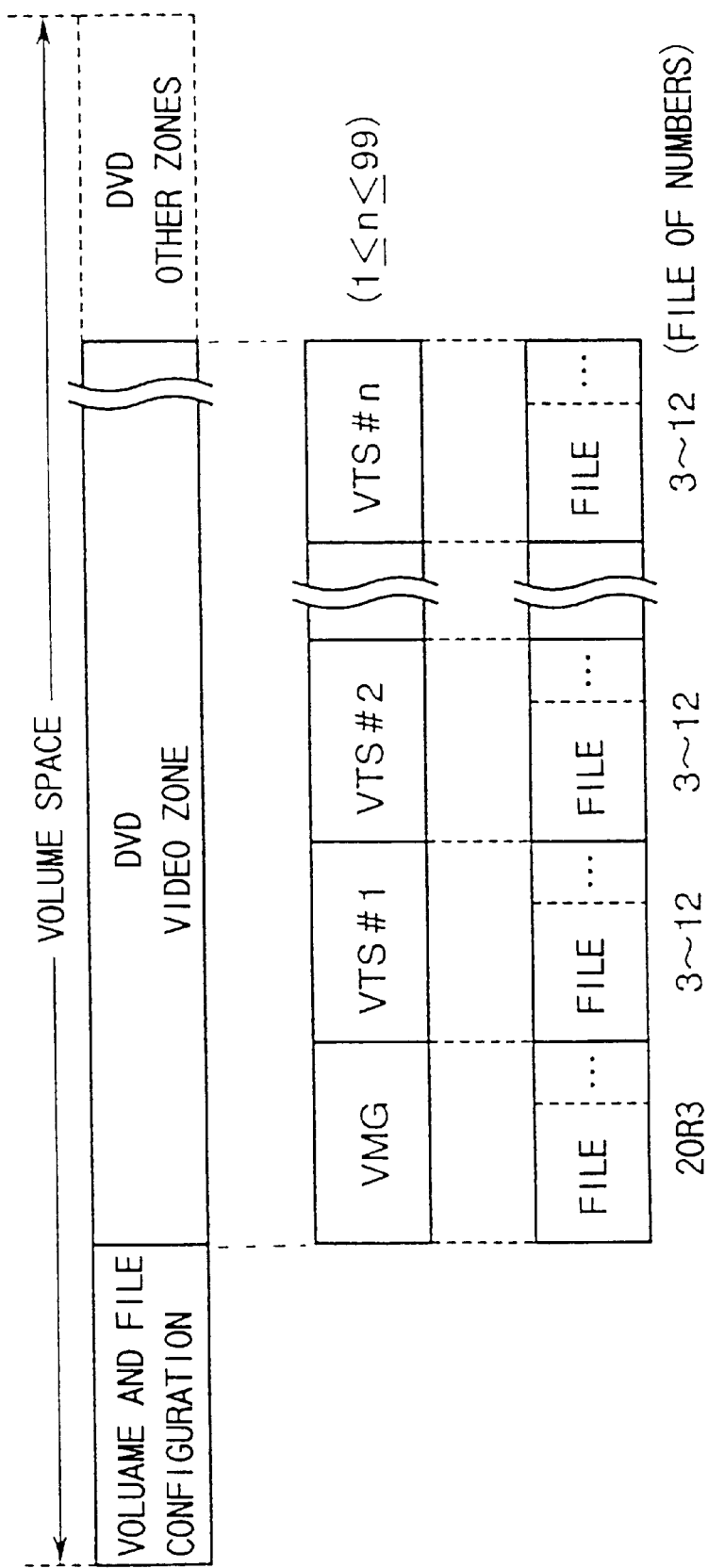
F I G. 15

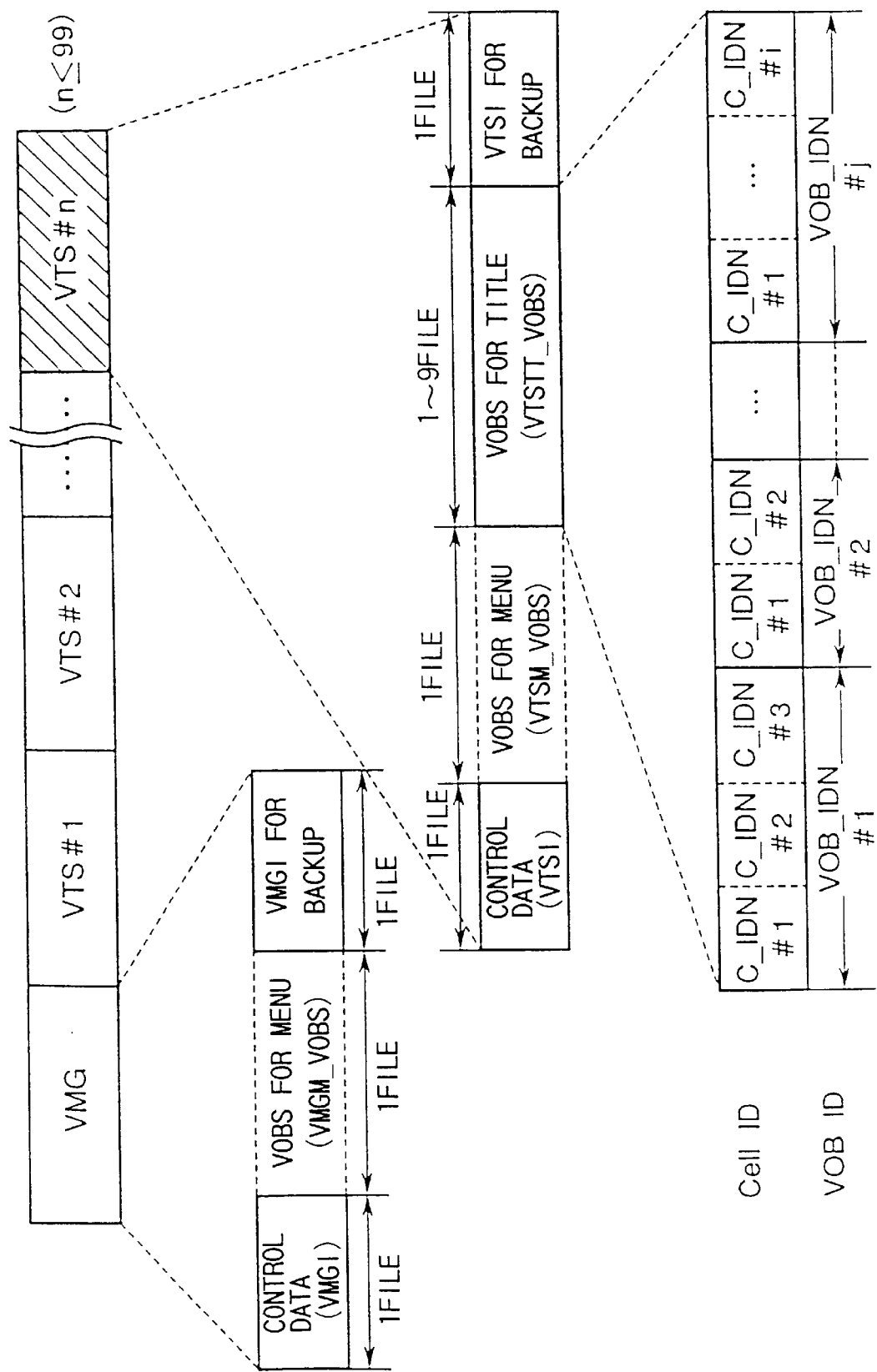
F I G. 16

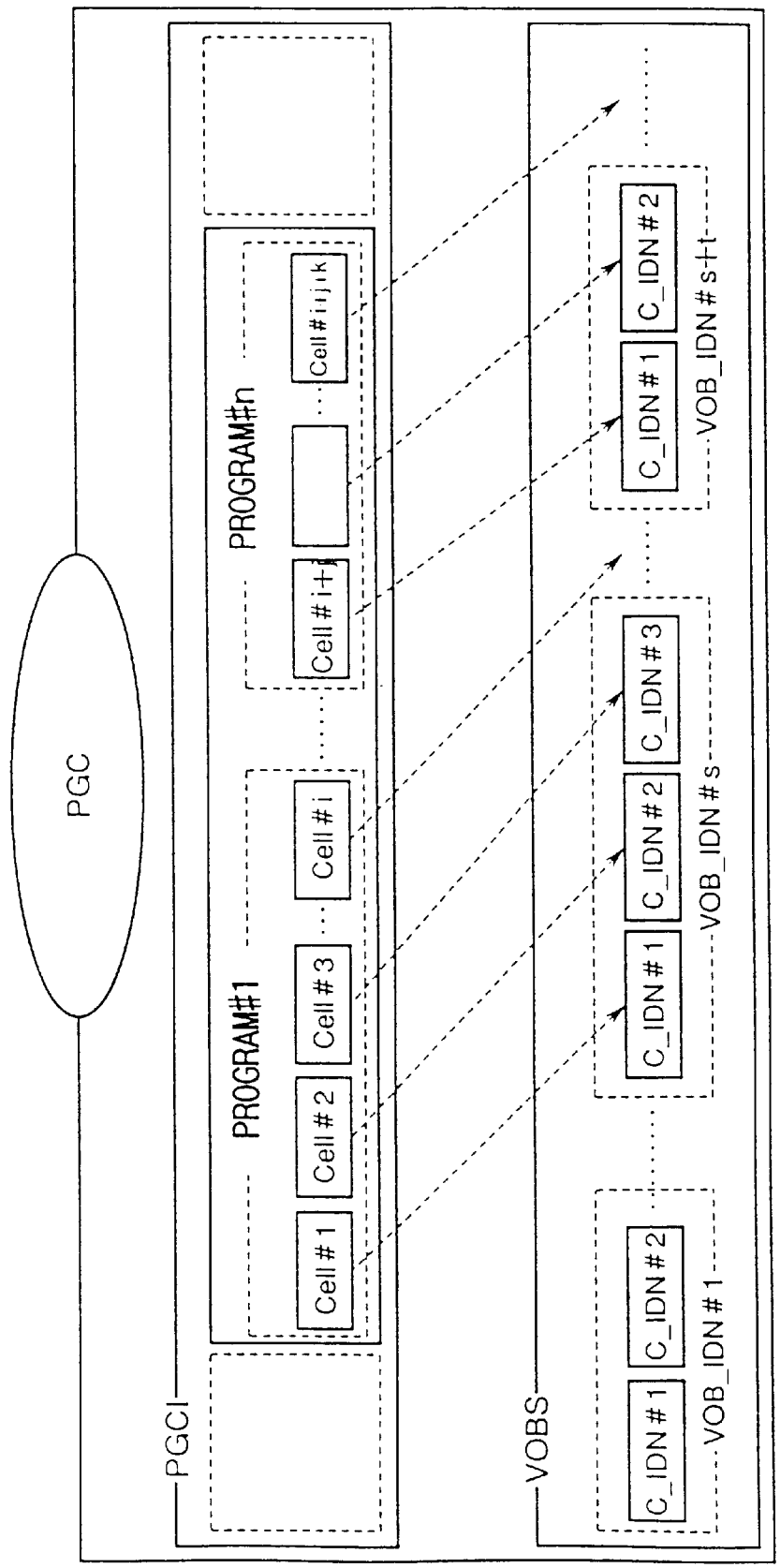
F I G. 18

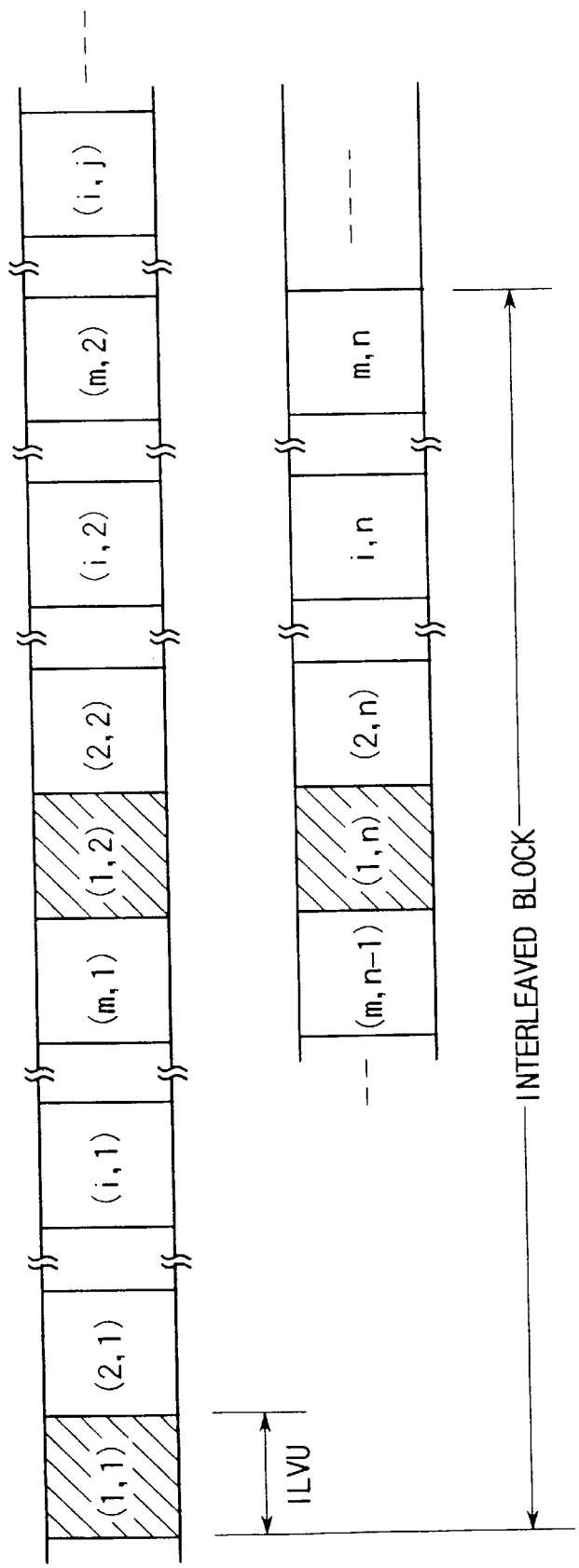
F I G. 2 0

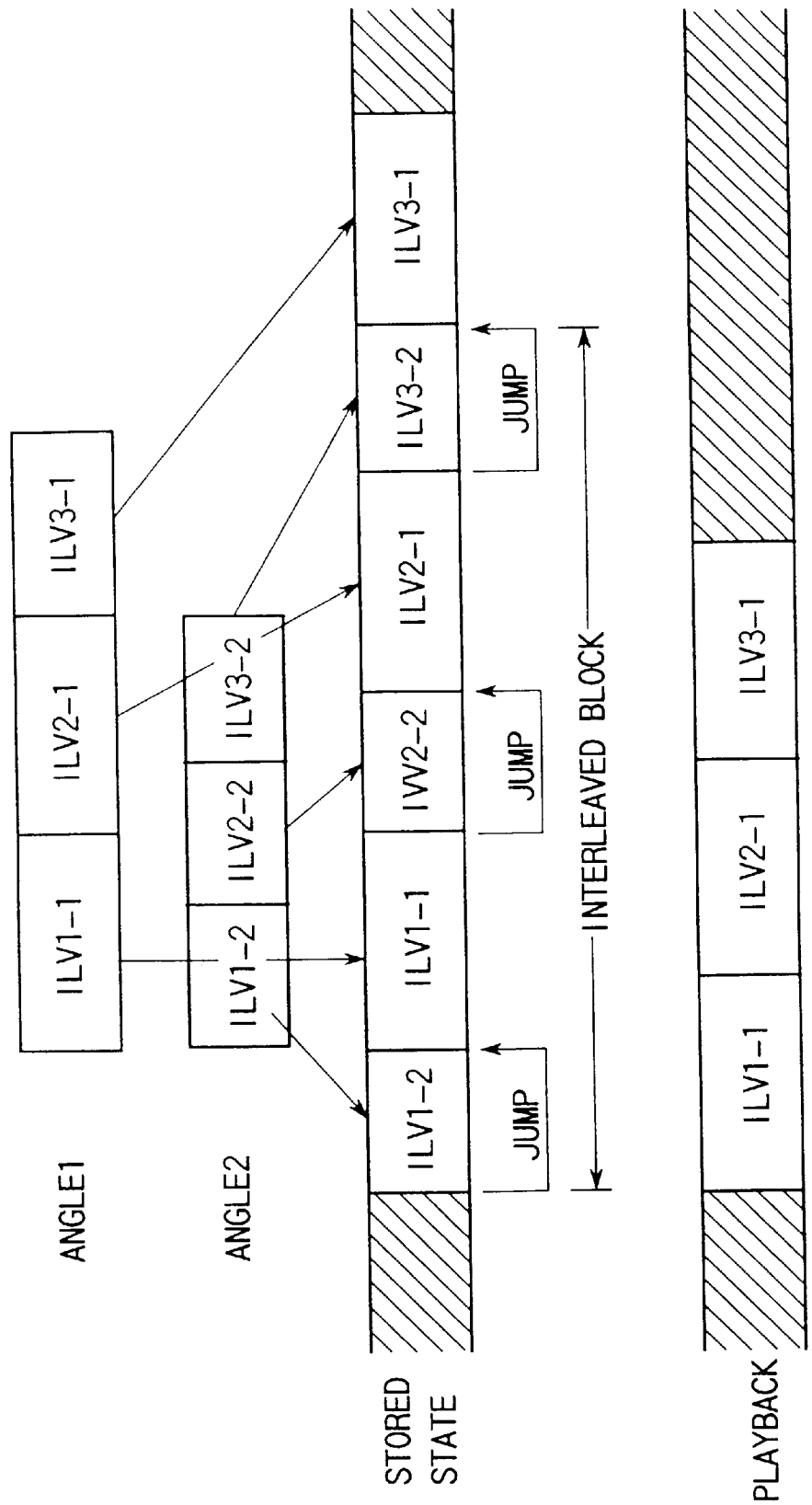
F I G. 21

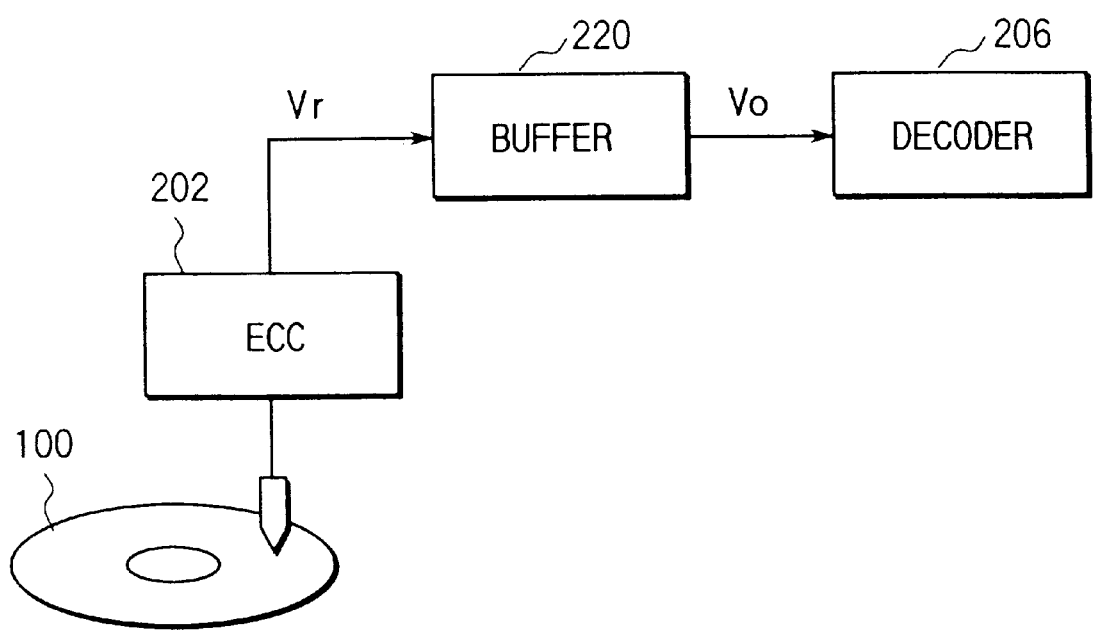
F I G. 22

| MAX MAX_Vo | [Mbps] | 8 | 8 | 7.5 | 7 |
|---|---|---|---|---|---|
| MAX JUMP DISTANCE | [SECTOR] | 5,000 | 10,000 | 15,000 | 20,000 |
| MAX (2Tk+tj) | [msec] | 209+106 | 209+146 | 209+175 | 209+200 |
| MINI Bm | [SECTOR] | 201 | 221 | 220 | 216 |

F I G. 25

VIDEO TITLE SET (VTS)

| | |
|---|---|
| VIDEO TITLE SET INFORMATION (VTSI) | (Mandatory) |
| VIDEO OBJECT SET FOR VIDEO TITLE SET MENU (VTSM_VOBS) | (Optional) |
| VIDEO OBJECT SET FOR VIDEO TITLE SET MENU (VTSTT_VOBS) | (Mandatory) |
| BACKUP FOR VIDEO TITLE SET INFORMATION (VTSI_BUP) | (Mandatory) |

| | |
|---|---|
| VIDEO TITLE SET INFORMATION MANAGEMENT TABLE (VTSI_MAT) | (Mandatory) |
| VIDEO TITLE SET PART OF TITLE SEARCH POINTER TABLE (VTS_PTT_SRPT) | (Mandatory) |
| VIDEO TITLE SET PROGRAM CHAIN INFORMATION TABLE (VTS_PGCIT) | (Mandatory) |
| VIDEO TITLE SET MENU PGCI UNIT TABLE (VTSM_PGCI_UT) | (Mandatory) |
| VIDEO TITLE SET TIME MAP TABLE (VTS_TMAPT) | (Optional) |
| VIDEO TITLE SET MENU CELL ADDRESS TABLE (VTSM_C_ADT) | (Mandatory) |
| VIDEO TITLE SET MENU VIDEO OBJECT ADDRESS MAP (VTSM_VOBU_ADMAP) | (Mandatory when VTSM_VOBS exists) |
| VIDEO TITLE SET CELL ADDRESS TABLE (VTS_C_ADT) | (Mandatory when VTSM_VOBS exists) |
| VIDEO TITLE SET VIDEO OBJECT UNIT ADDRESS MAP (VTS_VOBU_ADMAP) | (Mandatory) |

F I G. 26

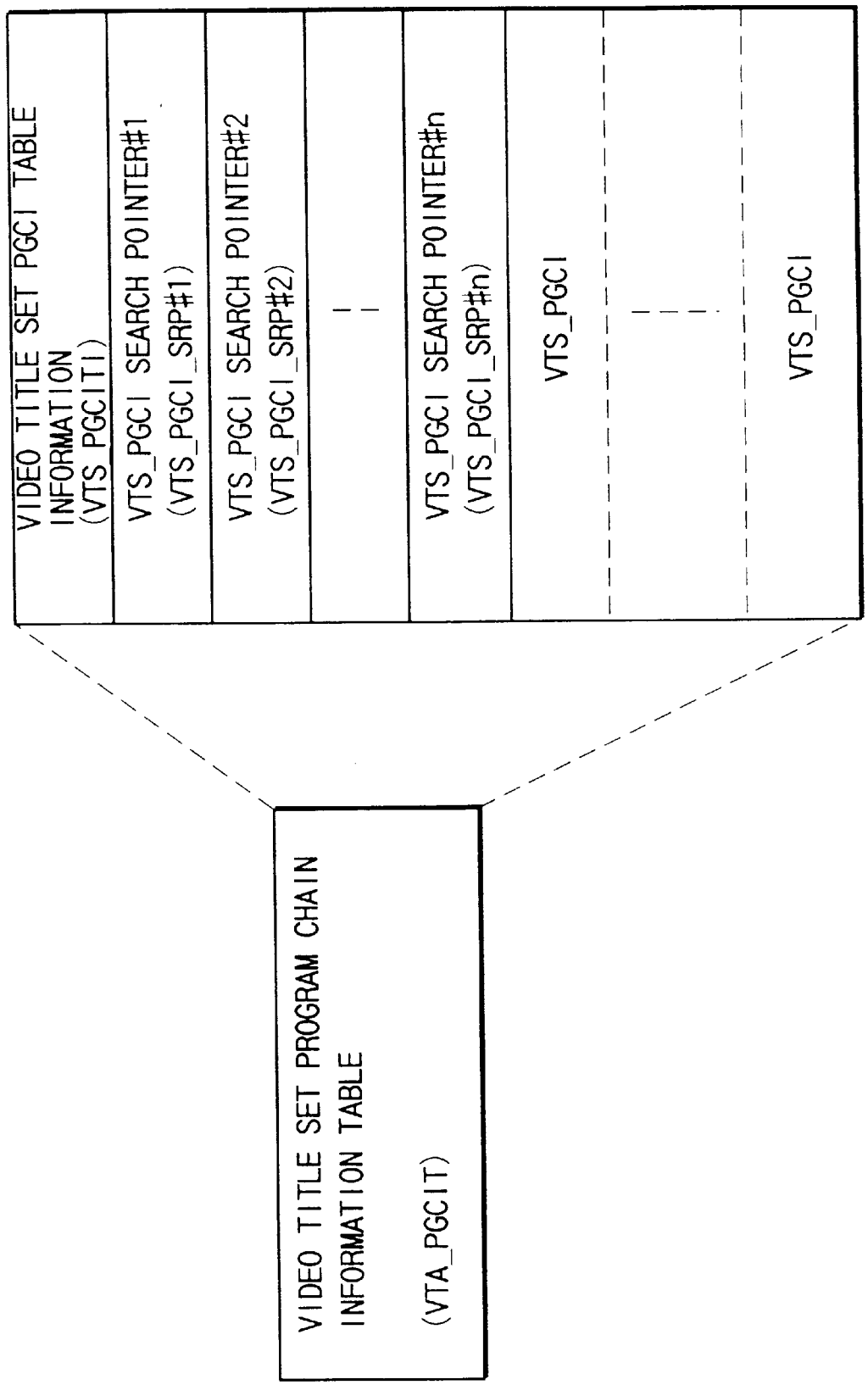
F I G. 27

PROGRAM CHAIN INFORMATION (PGCI)

| |
|---|
| PROGRAM CHAIN GENERAL INFORMATION (PGC_GI) |
| PROGRAM CHAIN COMMAND TABLE (PGC_CMDT) |
| PROGRAM CHAIN PROGRAM MAP (PGC_PGMP) |
| CELL PLAYBACK INFORMATION TABLE (C_PBIT) |
| CELL POSITION INFORMATION TABLE (C_POSIT) |

F I G. 2 8

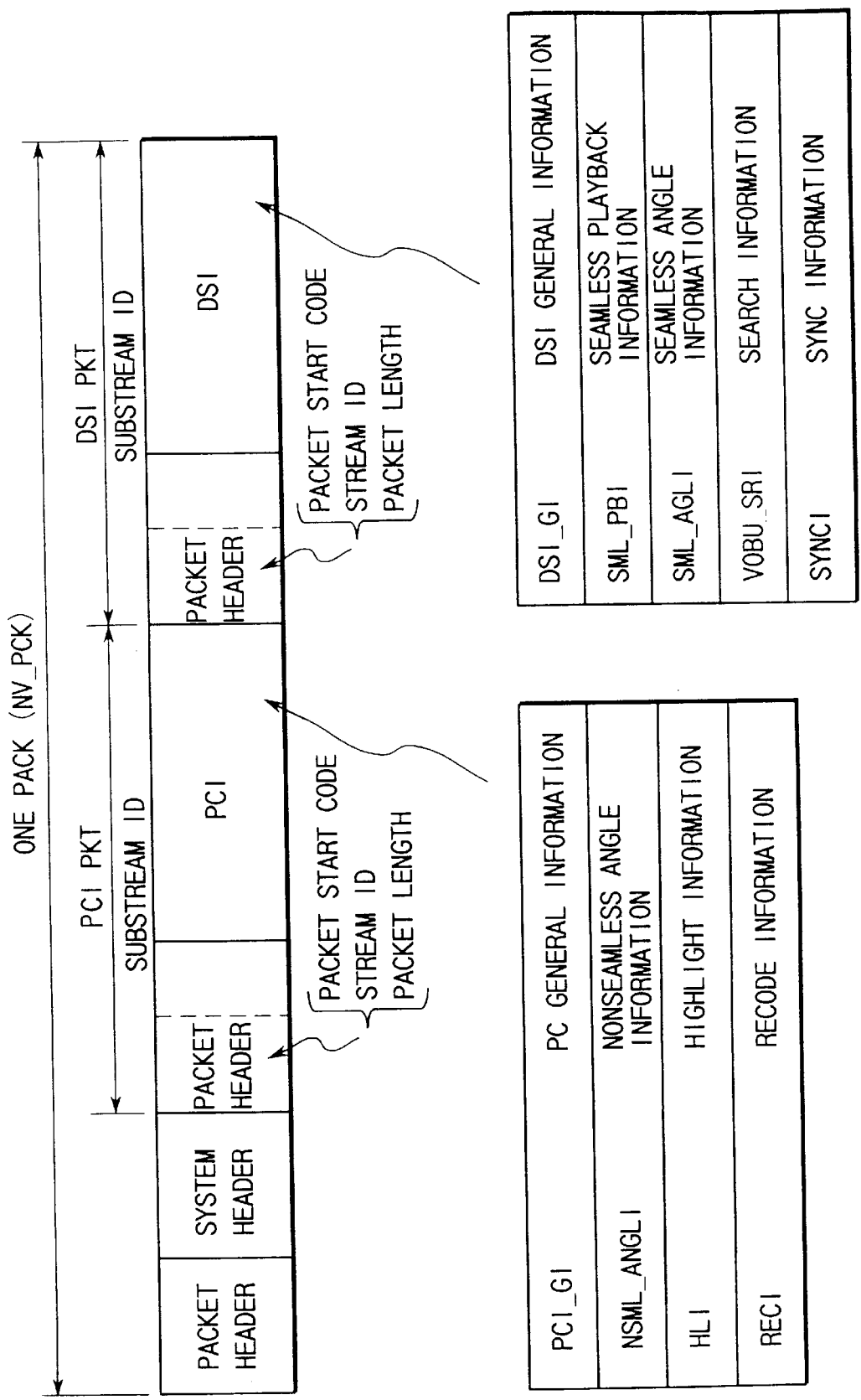
F I G. 32

| DSI_GI (DSI GENERAL INFORMATION) | |
|---|---|
| NV_PCK_SCR | SCR_BASE OF NV_PCK |
| NV_PCK_LBN | LBN OF NV_PCK |
| VOBU_EA | END ADDRESS OF VOBU |
| VOBU_1STREF_EA | END ADDRESS OF THE FIRST REFERENCE PICTURE IN VOBU |
| VOBU_2NDREF_EA | END ADDRESS OF THE SECOND REFERENCE PICTURE IN VOBU |
| VOBU_3RDREF_EA | END ADDRESS OF THE THIRD REFERENCE PICTURE IN VOBU |
| VOBU_VOB_IDN | VOB ID NUMBER OF THE VOBU |
|  | RESERVED |
| VOBU_C_IDN | CELL ID NUMBER OF THE VOBU |
| C_ELTM | CELL ELAPSE TIME |

FIG. 33

SML_PBI (SEAMLESS PLAYBACK INFORMATION)

| | |
|---|---|
| VOBU_SML_CAT | CATEGORY OF SEAMLESS VOBU |
| ILVU_EA | END ADDRESS OF INTERLEAVED UNIT |
| NXT_ILVU_SA | START ADDRESS OF THE NEXT INTERLEAVED UNIT |
| NXT_ILVU_SZ | SIZE OF THE NEXT INTERLEAVED UNIT |
| VOB_V_S_PTM | VIDEO START PTM IN VOB |
| VOB_V_E_PTM | VIDEO END PTM IN VOB |
| VOB_A_STP_PTM | AUDIO STOP TIME IN VOB |
| VOB_A_GAP_LEN | AUDIO GAP LENGTH IN VOB |

FIG. 34

| SML_AGLI (SEAMLESS ANGLE INFORMATION) | |
|---|---|
| SML_AGL_C1_DSTA | ADDRESS AND SIZE OF DESTINATION ILVU IN AGL_C1 |
| SML_AGL_C2_DSTA | ADDRESS AND SIZE OF DESTINATION ILVU IN AGL_C2 |
| SML_AGL_C3_DSTA | ADDRESS AND SIZE OF DESTINATION ILVU IN AGL_C3 |
| SML_AGL_C4_DSTA | ADDRESS AND SIZE OF DESTINATION ILVU IN AGL_C4 |
| SML_AGL_C5_DSTA | ADDRESS AND SIZE OF DESTINATION ILVU IN AGL_C5 |
| SML_AGL_C6_DSTA | ADDRESS AND SIZE OF DESTINATION ILVU IN AGL_C6 |
| SML_AGL_C7_DSTA | ADDRESS AND SIZE OF DESTINATION ILVU IN AGL_C7 |
| SML_AGL_C8_DSTA | ADDRESS AND SIZE OF DESTINATION ILVU IN AGL_C8 |
| SML_AGL_C9_DSTA | ADDRESS AND SIZE OF DESTINATION ILVU IN AGL_C9 |

F I G. 35

CONTENTS

| | | |
|---|---|---|
| FWDI | VIDEO | NEXT VOBU START ADDRESS WITH A VIDEO DATA |
| FWDI | 240 | +240 VOBU START ADDRESS AND VIDEO EXIST FLAG |
| FWDI | 140 | +120 VOBU START ADDRESS AND VIDEO EXIST FLAG |
| FWDI | 60 | + 60 VOBU START ADDRESS AND VIDEO EXIST FLAG |
| FWDI | 20 | + 20 VOBU START ADDRESS AND VIDEO EXIST FLAG |
| FWDI | 15 | + 15 VOBU START ADDRESS AND VIDEO EXIST FLAG |
| FWDI | 14 | + 14 VOBU START ADDRESS AND VIDEO EXIST FLAG |
| FWDI | 13 | + 13 VOBU START ADDRESS AND VIDEO EXIST FLAG |
| FWDI | 12 | + 12 VOBU START ADDRESS AND VIDEO EXIST FLAG |
| FWDI | 11 | + 11 VOBU START ADDRESS AND VIDEO EXIST FLAG |
| FWDI | 10 | + 10 VOBU START ADDRESS AND VIDEO EXIST FLAG |
| FWDI | 9 | + 9 VOBU START ADDRESS AND VIDEO EXIST FLAG |
| FWDI | 8 | + 8 VOBU START ADDRESS AND VIDEO EXIST FLAG |
| FWDI | 7 | + 7 VOBU START ADDRESS AND VIDEO EXIST FLAG |
| FWDI | 6 | + 6 VOBU START ADDRESS AND VIDEO EXIST FLAG |
| FWDI | 5 | + 5 VOBU START ADDRESS AND VIDEO EXIST FLAG |
| FWDI | 4 | + 4 VOBU START ADDRESS AND VIDEO EXIST FLAG |
| FWDI | 3 | + 3 VOBU START ADDRESS AND VIDEO EXIST FLAG |
| FWDI | 2 | + 2 VOBU START ADDRESS AND VIDEO EXIST FLAG |
| FWDI | 1 | + 1 VOBU START ADDRESS AND VIDEO EXIST FLAG |
| FWDI | NEXT | NEXT VOBU START ADDRESS AND VIDEO EXIST FLAG |
| FWDI | PREV | PREVIOUS VOBU START ADDRESS AND VIDEO EXIST FLAG |
| BWDI | 1 | − 1 VOBU START ADDRESS AND VIDEO EXIST FLAG |
| BWDI | 2 | − 2 VOBU START ADDRESS AND VIDEO EXIST FLAG |
| BWDI | 3 | − 3 VOBU START ADDRESS AND VIDEO EXIST FLAG |
| BWDI | 4 | − 4 VOBU START ADDRESS AND VIDEO EXIST FLAG |
| BWDI | 5 | − 5 VOBU START ADDRESS AND VIDEO EXIST FLAG |
| BWDI | 6 | − 6 VOBU START ADDRESS AND VIDEO EXIST FLAG |
| BWDI | 7 | − 7 VOBU START ADDRESS AND VIDEO EXIST FLAG |
| BWDI | 8 | − 8 VOBU START ADDRESS AND VIDEO EXIST FLAG |
| BWDI | 9 | − 9 VOBU START ADDRESS AND VIDEO EXIST FLAG |
| BWDI | 10 | − 10 VOBU START ADDRESS AND VIDEO EXIST FLAG |
| BWDI | 11 | − 11 VOBU START ADDRESS AND VIDEO EXIST FLAG |
| BWDI | 12 | − 12 VOBU START ADDRESS AND VIDEO EXIST FLAG |
| BWDI | 13 | − 13 VOBU START ADDRESS AND VIDEO EXIST FLAG |
| BWDI | 14 | − 14 VOBU START ADDRESS AND VIDEO EXIST FLAG |
| BWDI | 15 | − 15 VOBU START ADDRESS AND VIDEO EXIST FLAG |
| BWDI | 20 | − 20 VOBU START ADDRESS AND VIDEO EXIST FLAG |
| BWDI | 60 | − 60 VOBU START ADDRESS AND VIDEO EXIST FLAG |
| BWDI | 120 | −120 VOBU START ADDRESS AND VIDEO EXIST FLAG |
| BWDI | 240 | −240 VOBU START ADDRESS AND VIDEO EXIST FLAG |
| BWDI | VIDEO | PREVIOUS VOBU START ADDRESS WITH A VIDEO DATA |

F I G. 36

| SYNCI (SYNC INFORMATION) | |
|---|---|
| A_SYNCA 0 TO 7 | ADDRESS OF AUDIO PACK TO BE SYNCHRONIZED |
| SP_SYNCA 0 TO 31 | VOBU SUBVIDEO PACK STARTING ADDRESS |

F I G. 37

INFORMATION STORAGE MEDIUM, RECORDING METHOD USED THEREFOR, AND REPRODUCING APPARATUS

BACKGROUND OF THE INVENTION

The invention relates to an information recording method useful in recording video, sound, subvideo, etc. on a recording medium, such as an optical disk or the like, and a recording medium and a reproducing apparatus used with the method.

In recent years, optical disks on which video, sound, subvideo, etc. are recorded have developed to record information at a high density. Playback apparatuses have been developed to retrieve the information recorded. In recording information, such as a movie, on an optical disk, it has been proposed to record story data for multiple stories that proceed simultaneously. For example, suppose brothers A and B pursue their separate courses in life as they grow up, one of them becomes a police officer (the first story), the other becomes a gangster (the second story), and after some time, they meet again and then get along together. This is the type of story data used for multiple stories that proceed simultaneously.

In addition, in recording information, such as a movie on an optical disk, it has been proposed to record the same event from multiple angles to produce simultaneously proceeding multi-angle scenes. For example, a multi-angle scene could have a first scene of a ship crossing over the ocean viewed from land and a second scene of the land viewed from the ship at the same time.

A producer has options of showing viewers the first and second stories in combination, showing mainly the first story to viewers, or showing mainly the second story to viewers. However, in conventional movie production practices, one of the options must be chosen.

The same may be said of the first and second scenes. If viewers were able to choose freely between the first and second stories or the first and second scenes, the producer would have greater freedom in movie production.

In recent years, an optical disk and playback system has been developed in which multiple stories or multiple scenes that proceed simultaneously have been recorded in advance and viewers are allowed to choose from among them.

It is preferable that multiple stories or scenes be recorded on an optical disk in such a way that, at playback time, data will become convenient to handle. Suppose that story data on first and second stories are recorded serially. At playback time, only one of the stories is reproduced, it is required to jump to a storage area for the other. However, if the other story is short, the physical movement of the pickup will be small, causing no problem. If, however, the other story is lengthy, the physical movement of the pickup increases. For this reason, a break or disturbance may occur during video playback.

BRIEF SUMMARY OF THE INVENTION

It is an object of the invention to provide an information storage medium on which multiple stories or multi-angle scenes are recorded in such a way as to decrease the physical movement of a pickup at playback time and to suppress any breaking or disturbance in the reproduced video, a recording method and a reproducing apparatus used with the storage medium.

To attain this object, this invention, in recording onto a recording/recorded medium a video program that allows a main story to branch off into multiple branch scenes and the branch scenes to connect to a succeeding main story, divides data on each of the branch scenes into multiple scene cells and arranging the scene cells of the respective branch scenes on a time-division multiplexing basis.

By recording in this arrangement, the cells of the same branch scene are picked up at playback time for data reproduction. Even in playing back any branch scene, the distance moved by the pickup is not great, thus suppressing breaks or disturbance in reproduced video.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given above, serve to explain the principles of the invention.

FIG. 1 is a diagram used to explain an embodiment of an information recording medium and a recording method of the invention.

FIG. 2A is a diagram used to explain an exemplary arrangement of cells in FIG. 1 and an exemplary playback sequence thereof.

FIG. 2B is a diagram used to explain an exemplary arrangement of cells in FIG. 1 and another exemplary playback sequence thereof.

FIG. 3A is a diagram explaining of another embodiment of the information recording medium and the recording method of the invention.

FIG. 3B is a diagram for use in explaining still another embodiment of the information recording medium and the recording method of the invention.

FIG. 4A illustrates a cell or cells to which each of the cells of FIG. 3B is connected in the form of a table.

FIG. 4B illustrates an example of a specific arrangement of the cells of FIG. 4A.

FIG. 7A is a diagram for use in explaining a further embodiment of the information recording medium and the recording method of the invention.

FIG. 7B illustrates an exemplary arrangement of the cells of FIG. 7A on a track.

FIG. 8A is a diagram for use in explaining a still further embodiment of the information recording medium and the recording method of the invention.

FIG. 8B illustrates an exemplary arrangement of the cells of FIG. 8A on a track.

FIG. 9A is a diagram for use in explaining another embodiment of the information recording medium and the recording method of the invention.

FIG. 9B illustrates an exemplary arrangement of the cells of FIG. 9A on a track.

FIG. 10A is a diagram for use in explaining still another embodiment of the information recording medium and the recording method of the invention.

FIG. 10B is a diagram for use in explaining a further embodiment of the information recording medium and the recording method of the invention.

FIGS. 11A, 11B and 11C are diagrams for use in explaining other embodiments of the information recording medium and the recording method of the invention.

FIGS. 13A, 13B and 13C are diagrams for use in further explaining a dividing method used in recording multiple stories on the recording medium of the invention.

FIG. 14 is a schematic illustration of a playback apparatus for use with the recording medium of the invention.

FIG. 15 illustrates volume space on an optical disk to which the invention is applied.

FIG. 16 illustrates the structures of the video manager (VMG) and the video title sets (VTS) in more detail.

FIG. 18 is a diagram for use in explanation of an example of controlling the sequence in which the cells are played back by a program chain (PGC).

FIG. 20 illustrates an exemplary arrangement of interleaved blocks.

FIG. 21 illustrates a recorded state in which video objects of angle-1 and angle-2 scenes are arranged on one track with each divided into three interleaved units (ILVU11-1 to ILVU3-1, ILVU1-2 to ILVU3-2) and an exemplary playback output of the angle-1 scene.

FIG. 22 illustrates the optical disk playback apparatus of FIG. 14 in a simplified form.

FIG. 25 is a diagram for use in explaining examples of designs of the minimum capacity (Bm) of the track buffer, the kickback and seek time, the jump distance, and the amount of output data per unit time from the track buffer in the playback apparatus.

FIG. 26 illustrates video title set information (VTSI) in a video title set (VTS).

FIG. 27 illustrates the contents of a video title set program chain information table (VTS_PGCIT).

FIG. 28 illustrates the structure of program chain information (PGCI).

FIG. 32 illustrates an NV_PCK pack.

FIG. 33 illustrates information described in the data search general information (DSI_GI).

FIG. 34 illustrates information described in the seamless playback information (SML_AGLI).

FIG. 35 illustrates the contents of the seamless angle information (SML_AGLI).

FIG. 36 illustrates the VOBU search information (VOBU_SRI).

FIG. 37 illustrates the synchronization information.

DETAILED DESCRIPTION OF THE INVENTION

Preferred Embodiments

Figure 5:
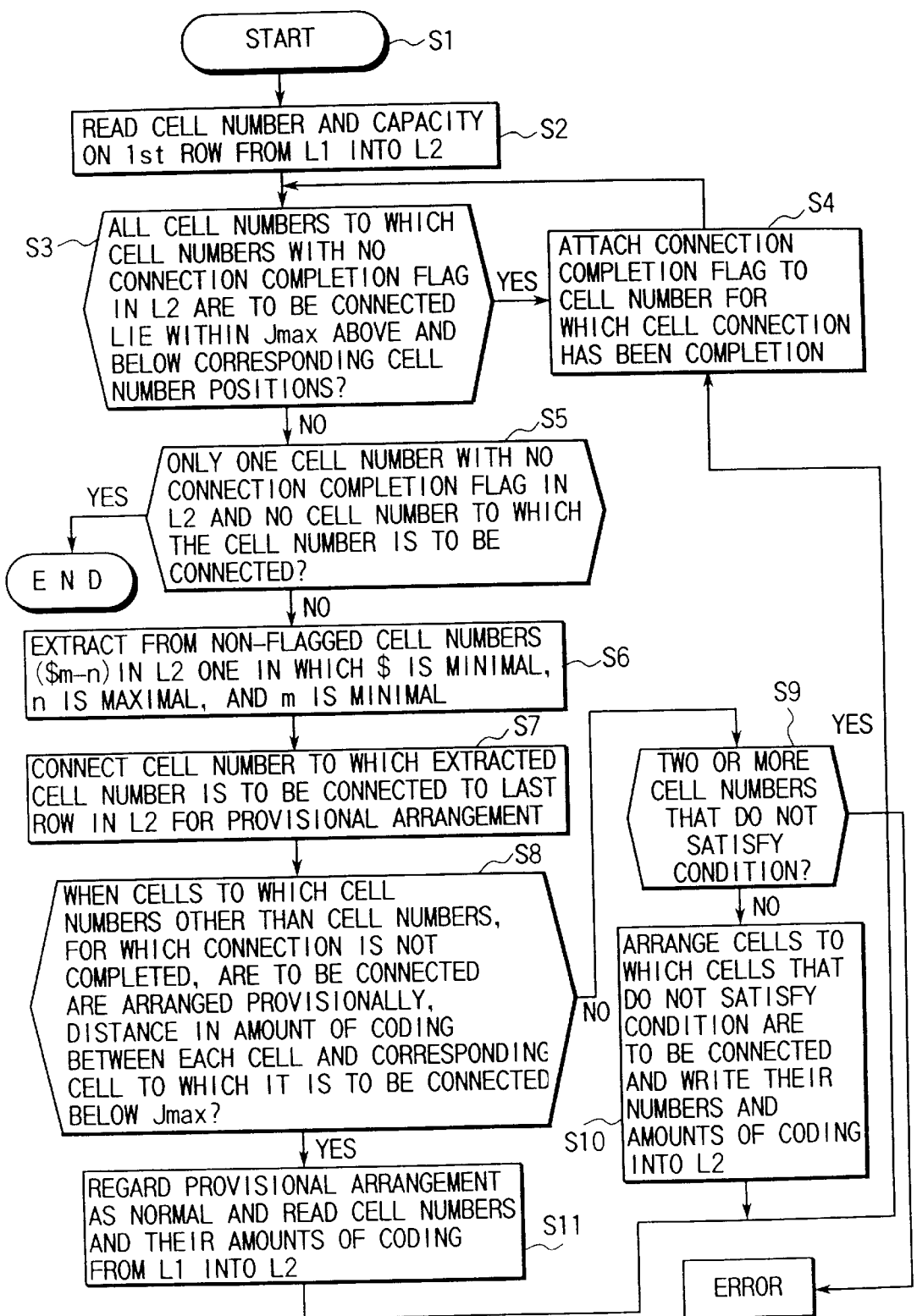
FIG. 5 is a diagram for use in explaining an exemplary arranging algorithm for the cells of FIG. 3B.

Hereinafter, the embodiments of the invention will be described with reference to the drawings.

FIG. 1 illustrates the flow of a video program on time axis for the purpose of describing an embodiment of the invention. This video program has a preceding main story (or scene) A, multiple branch stories B0 to B3, and a succeeding main story (or scene) C. The branch stories branch off at a point X which is the final position in the preceding main story A and join at a point Y of connection which is the initial point of the succeeding main story C. Here, the preceding main story, the branch stories and the succeeding main story in the video program are each divided into multiple scene cells. The cells of the branch story B0 are represented as B0-5, B0-4, . . . , B0-1, the cells of the branch story B1 as B1-2 and B1-1, the cells of the branch story B2 as B2-5, B2-4, . . . , and B2-1, and the cells of the branch story B3 as B3-5, B3-4, . . . , and B3-1.

One scene cell can be defined by various methods which will be described below.

For example, one scene cell may be defined with the physical length of a track on the recording medium taken as a unit, and any scene cell is set to be equal in length. Also, one scene cell may be defined with the length of time for playback taken as a unit, and any scene is set equal in playback time. When data is encoded, one scene cell may be defined as the amount of coding. Any scene cell is set equal in the amount of coding. In any definition, scene cells need not to be strictly set equal in length or amount, and it is required only that they be substantially equal to each other.

When there are multiple branch stories as described above which are recorded on a recording medium, each of the branch stories is arranged so that its scene cells will appear at the same rate relative to the sum of scene lengths of the branch stories. In the example of FIG. 1, there are four branch stories, and the 0-th branch story contains five scene cells, the first branch story contains two scene cells, and the second and third branch stories each have five scene cells. The sum of scene lengths is 17 cells. Thus, the 0-th, second and third branch stories are each arranged at a rate of 5/17, i.e., at a rate of one for about 3.5 cells. The 0-th branch story is arranged at a rate of 2/17, i.e., at a rate of one for 8.5 cells.

With such an arrangement, as shown by the recording arrangement of cells of FIG. 1, the jump interval when the first branch story is particularly played back becomes smaller than that which would be formed if the second branch story were arranged aggregated.

FIG. 2A illustrates the pickup interval for the 0-th branch story (solid arrows), the pickup interval for the third branch story (broken arrows), and the pickup interval for the first branch story (dashed-and-dotted arrows) in the above-described arrangement pattern.

FIG. 2B, on the other hand, illustrates the pickup interval for the 0-th branch story (solid arrows), the pickup interval for the third branch story (broken arrows), and the pickup interval for the first branch story (dashed-and-dotted arrows) in the case where each branch story is arranged in sequence. With such an arrangement, the pickup interval becomes very long, increasing the risk of a break or disturbance during video playback. With an arrangement of the invention, however, such a pattern as shown in FIG. 2A can be obtained, in which the pickup interval is narrowed, thereby suppressing a break or disturbance in reproduced video.

Next, arranging scene cells after scene cells of each branch story have been determined will be described.

Suppose now that there is a video program that has multiple branch stories (including multi-angle scenes) as shown in FIG. 3A. Multi-angle scenes refer to simultaneously proceeding videos that are shot from different angles, such as a video of a conductor shot close-up in a concert hall and a video of the whole orchestra shot from the seats in the hall.

In FIG. 3A, A0 is a preceding main scene, B0 is a dummy branch scene, and B1 and B2 are branch stories having different contents. This video program is divided into scene cells as shown in FIG. 3B. Each scene cell is marked with data capacity and given a cell number. Each of point of division, which is indicated by a black dot, serves as the beginning point of a video frame. In this example, the data playback time is set equal for all scene cells. The data is variably compressed data. Thus, even if the playback time is the same for all scene cells, the data capacity is not necessarily the same for all scene cells. In FIG. 3B, although B0 is indicated by one black dot, it is a dummy story and supposed to have no actual data.

When the scene cells are set in the above manner, a table L1 is set up, which indicates the cell number or numbers of a scene cell or cells to which each scene cell is connected as shown in FIG. 4A. That is, the scene cell number connected to the scene cell number A0-1 is A0-0 only. The cell number connected to the cell number A0-0 is B1-3 or B2-2 or C0-0, or C1-0. If each scene cell is associated in this way with a scene cell or cells to which it is connected, the table L1 shown in FIG. 4A can be obtained.

FIG. 4B is a cell-number table L2 set up to actually arrange each scene cell serially on a track of a recording medium on the basis of the information in the table of FIG. 4A.

Next, to actually arrange each scene cell serially on a track of a recording medium on the basis of the information in which a scene cell or cells to which each scene cell is connected, i.e., to obtain an arrangement in table L2, the order of arrangement is determined by the following procedure.

FIG. 5 shows an algorithm for determining the order in which cell numbers are arranged.

First, the cell number and the capacity on the first row in table L1 is written into the first row in table L2 (steps S1 and S2). The cell number to which the cell is connected is also read. Next, a decision is made as to whether all the cell numbers to which the associated cell number of cell numbers to which no connection completion flag is attached in table L2 is connected lie within the maximum allowable jump range (Jmax) in the forward and backward directions with respect to its cell number position.

The maximum allowable jump range (Jmax) is a value that is determined by the response speed of a pickup used in playback apparatus and the capacity (reproducing time) of an output buffer which temporarily stores data to be output for playback.

With the relationship between the cell number A0-1 and the cell number A0-0 to which A0-1 is connected, the Jmax (20 Mb in this example) is met. Thus, a connection completion flag is attached to the row for A0-1 in table L2 (step S4). Next, from table L1 are read the cell number A0-0, its data capacity, and the cell numbers B1-3, B2-2, C0-0 and C1-0 to which A0-0 is connected (step S3).

A decision is made as to whether all the cell numbers to which the associated cell number, of cell numbers A0-0, B1-3, B2-2, C0-0 and C1-0 to which no connection completion flag is attached, is connected fall within the maximum allowable jump range (Jmax) in the forward and backward directions with respect to its cell number position. In this case, the distances between A0-0 and C0-0 and between A0-0 and C1-0 exceed Jmax, so that the procedure goes to step S6 via step S5.

Step S5 makes a decision as to whether the number of cell numbers to which no connection completion flag is attached is only one and the cell number or numbers to which that cell number is present or absent and is one for the final decision of the completion of arrangement processing.

Since the arrangement is not completed at the time the cell number A0-0 was read, the procedure goes to step S6. In step S6, use is made of the cell number A0-0 and the cell numbers B1-3, B2-2, C0-0 and C1-0 to which the cell number A0-0 is connected to make the following decision. That is, with the assumption that a scene cell number is represented by $m–n, one in which $ is minimal and is selected first. In this example, there are B and C and hence B is selected (in this example it is assumed that A<B<C). Further, a situation in which n is maximal and m is minimal is extracted. That is, that n is large means that the number of divisions is large, and that m is small means that the priority assigned to a branch story is high.

In the above example, as can be seen from FIG. 3B, the scene cell number following A0-0 is B1-3. Next, the cell number B1-2 to which the cell number B1-3 thus extracted is connected is provisionally arranged on the last row in table L2 (step S7). It is B1-2 that follows B1-3. Thus, cell arrangement is in the order of A0-0, B1-3, B2-2, C0-0, C1-0, and B1-2.

Next, with all of cells to which other cell numbers (B2-2, C0-0, C1-0) than the extracted cell number B1-3 which have not been connected yet are connected being provisionally arranged to follow, a decision is made as to whether the distances in amount of coding between the cell numbers which have not been connected yet and the cells to which they are connected are all below Jmax (20 Mb) (step S8). In this example, B2-1, D0-0, D1-0, D0-0 and D1-0 will be further arranged to follow B2-2, C0-0, C1-0 and B1-2. In this case, the distance (the amount of coding) between B2-2 and B2-1, the distance between C0-0 and D0-0 and the distance between C1-0 and D1-0 are all within Jmax. As a result, it is determined that the provisional arrangement is normal and the procedure then returns to step S3 via step S11.

In step S3, the previous provisional arrangement contains B1-3, B2-2, C0-0, C1-0, and B1-2 and they have each been attached with a connection completion flag as being normal. Thus, B2-1, D0-0, D1-0, D0-0 and D1-0 are present as ones to which no connection completion flag is attached.

Next, suppose that, following B2-1, D0-0, D1-0, D0-0 and D1-0, the cell numbers to which each of them is connected are arranged. That is, the cell numbers are arranged such that B2-1, D0-0, D1-0, D0-0, D1-0, B2-0, E0-0, E1-0, E0-0 and E1-0. In step S3, a decision is made as to whether all the cell numbers to which a cell number (one that has been attached with no connection completion flag) is connected lie within the maximum allowable jump range (Jmax) in the forward and backward directions with respect to that cell number. In this case, all the cell numbers are above Jmax and hence the procedure goes to step S6. In step S6, B2-1 is extracted, and in step S7, B2-0 is taken out and B2-1, D0-0, D1-0, D0-0, D1-0 and B2-0 are arranged on the last row.

Next, in step S8 again, with all of cells to which the other cell numbers (D0-0, D1-0, D0-0, D1-0, B2-0) than the extracted cell number B2-1, which have not been connected yet, are connected being provisionally arranged to follow, a decision is made as to whether the distances in amount of coding between the cell numbers which have not been connected yet and the cells to which they are connected are all below Jmax (20 Mb). That is, when E0-0, E1-0, E0-0, E1-0, C0-0 and C1-0 are arranged to follow (D0-0, D1-0, D0-0, D1-0, B2-0), a decision is made as to whether the distance between each of D0-0, D1-0 and B2-0 and the cell number to which it is connected falls below 20 Mb. In this example, the distance between B2-0 and C0-0 and the distance between C1-0 exceed 20.

In this case, therefore, the procedure goes to step S9, in which a decision is made as to whether the number of cell numbers that do not meet the conditions is two or more. When the number is two or more, it is assumed that an error has occurred. In this example, the number is one and the procedure goes to step S10.

In step S10, all the cells to which unconnected cells that have not been connected yet and that do not meet the conditions are arranged and then their cell number and coding amount are read (in this case, C0-0 and C1-0 are read).

A return is made from step S10 to step S6, in which a cell number is selected in accordance with the above-described principles. That is, the cell number $m–n is extracted in which $ is minimal, n is maximal, and m is minimal. The procedure then goes to steps S7 and S8.

As described above, according to the algorithm, each of the branch stories is divided by the amounts of coding that, for example, permit an equal playback time to be obtained and the order of arrangement is determined by the principles indicated in steps S3 and S6.

Figure 6:
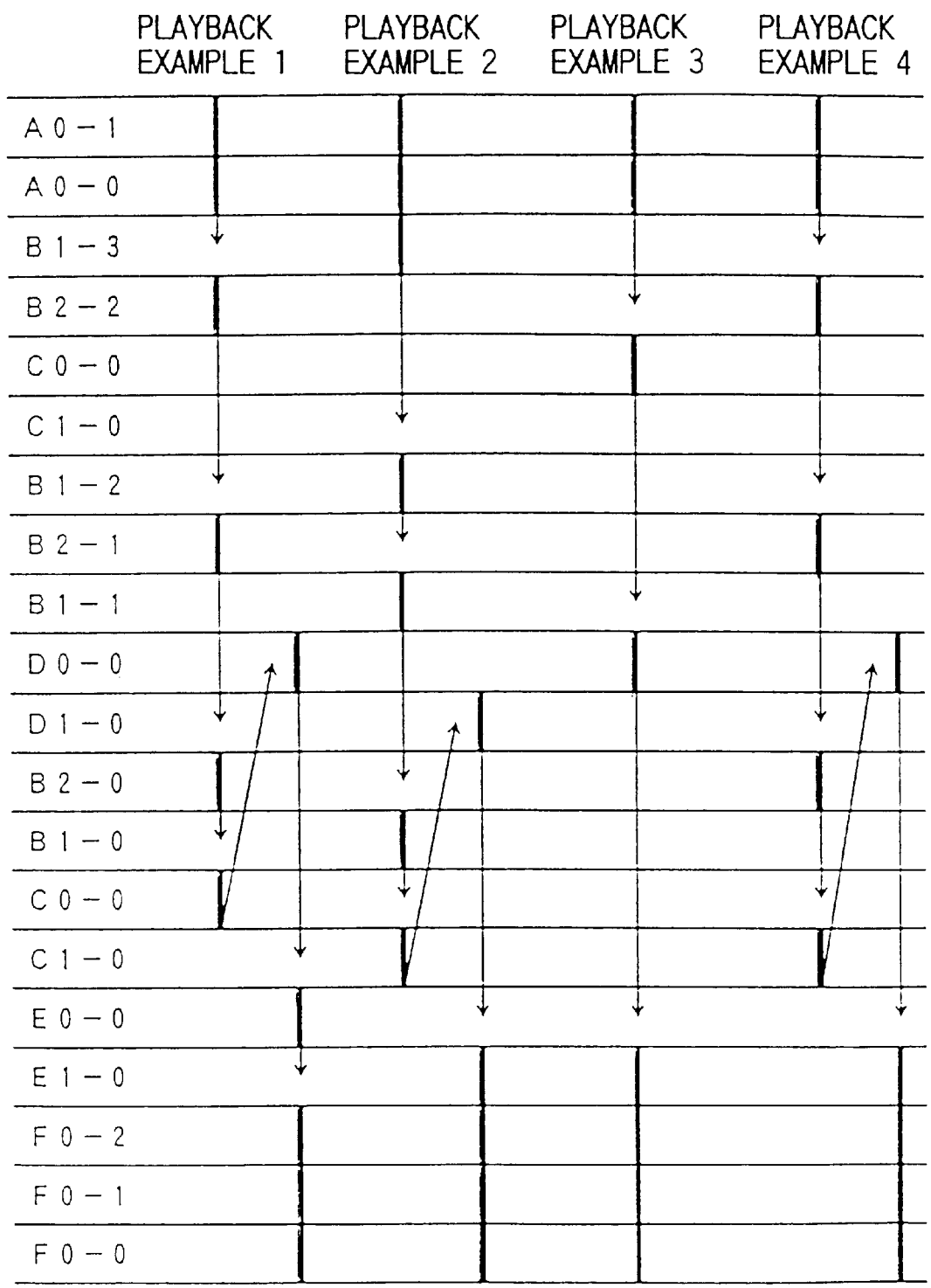
FIG. 6 is a diagram for use in explaining exemplary playback of the cells arranged as shown in FIG. 3B.

In FIG. 6 there are illustrated several playback examples in a disk on which a recording is made in accordance with an arrangement determined as described above. Scene cells are picked up in the order indicated by arrows.

The above example is one example and the invention can be implemented in various ways.

The dividing method shown in FIG. 3B can be modified in various ways. According to the above-described method of determining points of division, each of branch stories is divided into multiple scene cells by the amounts of coding that permit the playback time to be the same for all the cells of the branch stories, and the amounts of coding are referenced to make a decision of whether the distance over which the pickup makes a jump lies within the maximum jumping amount Jmax in accordance with the above-described algorithm.

However, in determining points of division, each branch story may be divided separately.

FIG. 7 shows an example in which there are three branch stories and each of the first, second and third stories is equally divided into three cells so that each cell will have an equal amount of coding. That is, as shown in FIG. 7A, the first branch story is separated into three cells, numbered B0-0, B0-1 and B0-2, each of an equal amount of coding (5 Mb), the second branch story is divided into three cells B1-0, B1-1 and B1-2 each of an equal amount of coding (7 Mb), and the third story is divided into three cells B2-0, B2-1 and B2-2 each of an equal amount of coding (6 Mb). The number of divisions is the same for each branch story, which is three in this example.

With such division, when, as shown in FIG. 7B, a set of cells B0-0, B1-0 and B2-0 is taken as scene cell block #0, a set of cells B0-1, B1-1 and B2-1 as scene cell block #1, and a set of cells B0-2, B1-2 and B2-2 as scene cell block #2, each scene cell block has an equal amount of coding.

The amount of coding (the amount of data) being equal means that the jumping distance is the same for playback of each of the branch streams B0, B1, and B2.

In the above example, division is made by an equal amount of coding. However, each branch may be divided by an equal playback time.

FIG. 8 shows an example in which there are three branch stories and each of the first, second and third stories is equally divided into three cells so that each cell will have an equal playback time. That is, as shown in FIG. 8A, the first branch story is separated into cells numbered B0-0, B0-1, B0-2, and B0-3 each of an equal playback time, the second branch story is divided into cells B1-0, B1-1, B1-2 and B1-3 each of an equal playback time, and the third story is divided into cells B2-0, B2-1, B2-2 and B2-3 each of an equal playback time.

In this case as well, as shown in FIG. 8B, scene cell blocks #0 to #3 can be obtained.

In the above examples, the cell arrangement method for multiple stories was described. The same method can be applied to the arrangement of multi-angle scenes. When one wants to watch pictures shot from a different angle from the middle, for example, when it is desired to watch pictures of the whole orchestra shot from seats in the concert hall in the middle of watching pictures of the conductor only shot in close-up, he or she can watch freely pictures shot from different angles if multi-angle pictures are recorded.

FIG. 9A shows multi-angle picture information. When a first angle scene D0-0 to D0-3 and a second angle scene D1-0 to D1-3 exist as an information source, scene cell blocks #0 to #3 are formed and arranged as shown in FIG. 9B by way of example.

FIG. 10 shows an example of a source when one of multiple stories ends in an extremely short time. FIG. 10B shows the case where each of the branch stories is divided by a predetermined number (4) into cells.

Even if, when one of the branch stories is extremely short as described above, the cells of the story B0 and the cells of the other stories are simply multiplexed together, the jump distance may become long when a transition is made from playback of the B0 story to playback of the next C0 story, failing to satisfy the conditions.

To solve this problem, such a method as shown in FIG. 11A is used. First, as shown in FIG. 11A, a part of the succeeding main story C0 is added to each of the branch stories B0, B1 and B2, and the point of connection is shifted backwards. The branch stories are then taken as B0(E), B1(E), and B2(E) as shown in FIG. 11B. Each of the branch stories B0(E), B1(E) and B2(E) is divided into cells, which are numbered as shown in FIG. 11C. The method of subsequent arrangement is the same as the procedure described previously. In this example, each branch story is divided into five cells.

Figure 12:
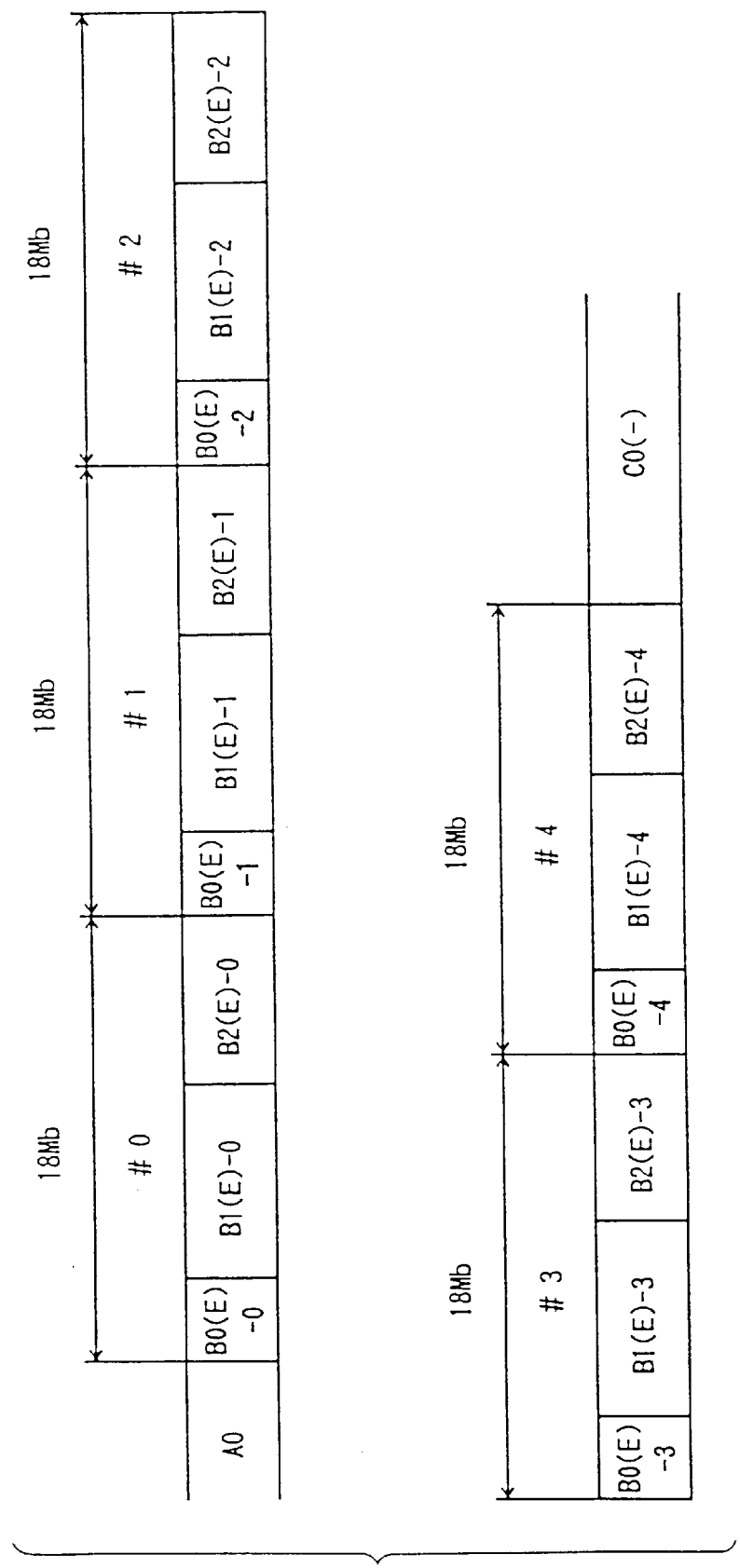
FIG. 12 is a diagram of an exemplary arrangement of the cells of FIG. 11C.

FIG. 12 shows the state in which cell blocks #0, #1, . . . are prepared and arranged, each block containing one cell selected from each branch story. These scene cell blocks each contain an error correcting code. In this example, the scene cell blocks have the same amount of coding. With compressed data by the MPEG2 system in general, division is made so that non-compressed video data, i.e., I-picture or intra-frame compressed data or data expandable without the use of other frame compressed data, is contained at the beginning of cells. This is because, in view of the compression system, in the absence of non-compressed video data in the leading cell, succeeding compressed video data cannot be reproduced.

Reference will be made to FIGS. 13A to 13C to explain exemplary division of multiple stories mathematically in the case where they are recorded divided.

As shown in FIG. 13A, suppose that a video program, composed of video, sound, text, etc., contains optionally selectable multiple branch stories B0, B1 and B2 between a point X of branch from a preceding main story A and a point Y of connection to a succeeding main story C. Suppose that the recorded states between the point X of branch and the point Y of connection on a recording medium are arranged as shown in FIG. 13B. Suppose that the branch story B0 is played back as shown in FIG. 13C. Then, the playback apparatus must jump from one cell to another for playback. Actually, the pickup will perform processing while reading data and validating the read data.

Suppose here that each branch story is divided into m cells. Then, the playback interval (jump distance) of the story that is the shortest as a whole, B0 in this example, will be the longest. Thus, consideration is given to the shortest story.

If the whole capacity of B0 is taken as V0, then the capacity of one cell in B0 will be V0/m.

Next, the playback time Tp for B0-0 is given by $$Tp=(V0/m)/Pr$$

and the read time Tr for B0-0 is given by $$Tr=(V0/m)/Rr$$

where Pr is the maximum code playback rate per unit time of the playback apparatus and Rr is the read rate of the playback apparatus.

At the time of playback of B0, the amount of coding Vj over which a jump is to be made is represent by $$VJ = \sum_{i=1}^{M-1} (Vi/m)$$

where i represent story numbers and M represents the number of stories.

The jump time Tjp at the time of playback of B0 is represented by $$Tjp = \sum_{i=1}^{M-1} [(Vi/m)/Jp]$$

where Jp is the amount of coding over which the playback apparatus can jump.

When it is made a condition that the jump time required for jump to the next cell is shorter than the playback time, i.e., Tp−Tr>Tjp, the following expression can be obtained $$((V0/m)/Pr) - ((V0/m)/Rr) > \sum_{i=1}^{M-1} [(Vi/m)/Jp] \quad (1)$$

The number of divisions is set in accordance with expression (1).

The points of division for obtaining the cells should be determined according to the format of data so that no disturbance will occur in reproduced data. Thus, there is no need of dividing strictly by rote so as to meet the above condition only. For example, in a video program in which compressed video data, compressed sound data and compressed subvideo data are time-division multiplexed, time division points should be made cell division points. The cells contain compressed video data, compressed sound data, and compressed subvideo data. Further, in the case of coded video data compressed by the MPEG2 system, the data is preferably divided in units of a group of pictures (GOP) having a playback time of the order of 0.4 to 0.5 seconds.

The invention is not restricted to the above description and can be implemented and modified in various ways. The above description is one of the basic principles of the invention.

If each cell has its identification number and the next cell's identification number appended, it becomes convenient to handle at playback time. To handle the cells, management information in which the order in which the cells are played back has been set up is utilized in the control unit of the playback apparatus. To increase data reliability, each cell may contain an error correcting code that permits correction processing to be concluded in it. In the examples of FIGS. 7 and 8 in which the cells of the respective branch scenes are time-division multiplexed, the first to n-th scene cell blocks are arranged in sequence and each scene cell block is made up by cells from different branch scenes. In this case, each scene cell block may contain an error correcting code that is inconcluded in it.

In the invention, the division of each branch scene into cells and the arrangement of the cells of the respective branch scenes on a time-division multiplexing basis can be described roughly as follows.

That is, the cells are divided and then arranged time-division multiplexed so as to meet the condition that Tp>Ts where Tp is the actual playback time required for the reproduction circuit to play back a video unreproduced portion of a reproduce cell read by the pickup of the playback apparatus and Ts is the read time required for the pickup to search for and read the next cell succeeding that reproduce cell. In this case, the playback time by the playback circuit of the playback apparatus is determined by the capacity of a buffer memory for storing reproduced signals, the amount of data multiplied by the compression rate, and the read clock frequency, and the read time is determined as a parameter consisting mainly of the response speed of the pickup.

In the optical disk, multiple branch scenes between the point of branch and the point of connection are recorded in the form such that each of the branch scenes is divided into cells each corresponding to a predetermined video playback time and cells that are to be played back successively are placed within a distance corresponding to a predetermined amount of coding. Suppose here that, in the playback apparatus, the time required to seek the distance corresponding to the predetermined amount of coding is Ts, the amount of read data per unit time is Rr, and the maximum amount of coding per unit time dissipated for video playback is Pr. Then, the time Ts and the time Tc required for the playback apparatus to decode one cell by means of a decoder and provide a video reproduced output are related by $$Tc-[(Tc \times Pr)/Rr] > Ts$$

FIG. 14 shows an arrangement of the playback apparatus for playing back the above-described information recording medium (optical disk).

A disk 100 is placed on a turntable 101 driven by a motor 102 to rotate. In playback mode, information recorded on the disk 100 is picked up by a pickup unit 103. The pickup unit 103 is subject to movement control and tracking control by a pickup driver 104. An output of the pickup unit 103 is entered into a demodulator 201 for demodulation. The demodulated data is entered into an error correcting unit 202 for error correction and then into a demultiplexer 203 through a butter memory 220. The demultiplexer 203 separately derives video information, caption and text information, sound information, control information, etc. That is, caption and character information (subpicture), sound information and the like are recorded on the disk 100 to correspond with video information. In this case, as caption and character information and sound information, a choice can be made from various languages under the control of a system controller 204.

To the system controller 204 is applied a user operation input via an operating unit 205.

The video information separated by the demultiplexer 203 is entered into a video decoder 206 where it is subjected to a decoding process corresponding to the type of a display unit. For example, it is converted to meet NTSC, PAL, SECAM, wide screen, or the like. The subpicture separated by the demultiplexer 203 is entered into a subpicture processor 207 where it is decoded into a caption and character video. A video signal decoded by the picture decoder 206 is entered into an adder 208 where it is added to the caption and character video (subpicture). The adder output is applied to an output terminal 209. The sound information selected and separated by the demultiplexer 203 is entered into an audio decoder 211 where it is demodulated and then applied to an output terminal 212. In addition to the audio decoder 211, the audio processing unit includes an audio decoder 213, which can reproduce voice in another language and apply it to an output terminal 214.

The buffer memory 220 is provided to follow the error correcting unit 202. The reproduced data is temporarily stored in the buffer memory 220 and then applied to the multiplexer 203 according to the decoding speed. When the buffer memory 220 overflows with data in normal continuous playback, the system controller 204 performs kickback processing. The kickback processing is to read data for predetermined sectors read so far again and is a function of compensating for the loss of data when the buffer memory 220 overflows with data.

When an optical disk containing multiple stories is played back, a list of options for the multiple stories, serving as disk management information, is displayed as a menu on, for example, the monitor screen or the system subdisplay unit. The user is allowed to make a choice among the multiple stories in advance through the remote-control operating unit 205 while watching the menu.

Upon receipt of option information, the system controller 204 grasps identification information of the branch story and extracts from the buffer memory 220 data with the header to which the identification information is attached and applies it to the demultiplexer 203.

As described above, according to the invention, data for multiple stories or scenes are recorded on a recording medium so as to allow the physical distance the pickup moves at playback time to be short, preventing a break or disturbance in reproduced video from occurring.

Next, an optical display playback system to which the invention is applied will be described specifically.

First, the kind of information is recorded as information related to the invention on an optical disk will be described.

FIG. 15 shows volume space on the optical disk 100. As shown in FIG. 15, the volume space consists of a volume and file configuration zone, a DVD video zone, and other zones. In the volume and file configuration zone is described a UDF (Universal Disk Format Specification Revision 1.02) configuration, the data of which can be read by any computer that meets a predetermined standard. The DVD video zone has a video manager (VMG) and a video title set (VTS). The video manager (VMG) and the video title set (VTS) each consist of multiple files. The video manager (VMG) is information for controlling the video title set (VTS).

In FIG. 16 there is illustrated in more detail the structures of the video manager (VMG) and the video title set (VTS).

The video manager (VMG) has video manager information (VMGI) as control data and a video object set (VMGM_VOBS) as data for menu display. Also, backup video manager information (VMGI) that is identical in content to the VMGI is included.

The video title set (VTS) contains video title set information (VTSI) as control data, a video object set (VTSM_VOBS) as data for menu display, and a video object set (VTSTT_VOBS) for the title of a video title set that is a video object set for video display. Also, backup video title set information (VTSI) that is identical in content to the VMGI is included.

The video object set (VTSTT_VOBS) for video display is made up by multiple cells. Each cell is assigned a cell identification number.

Figure 17:
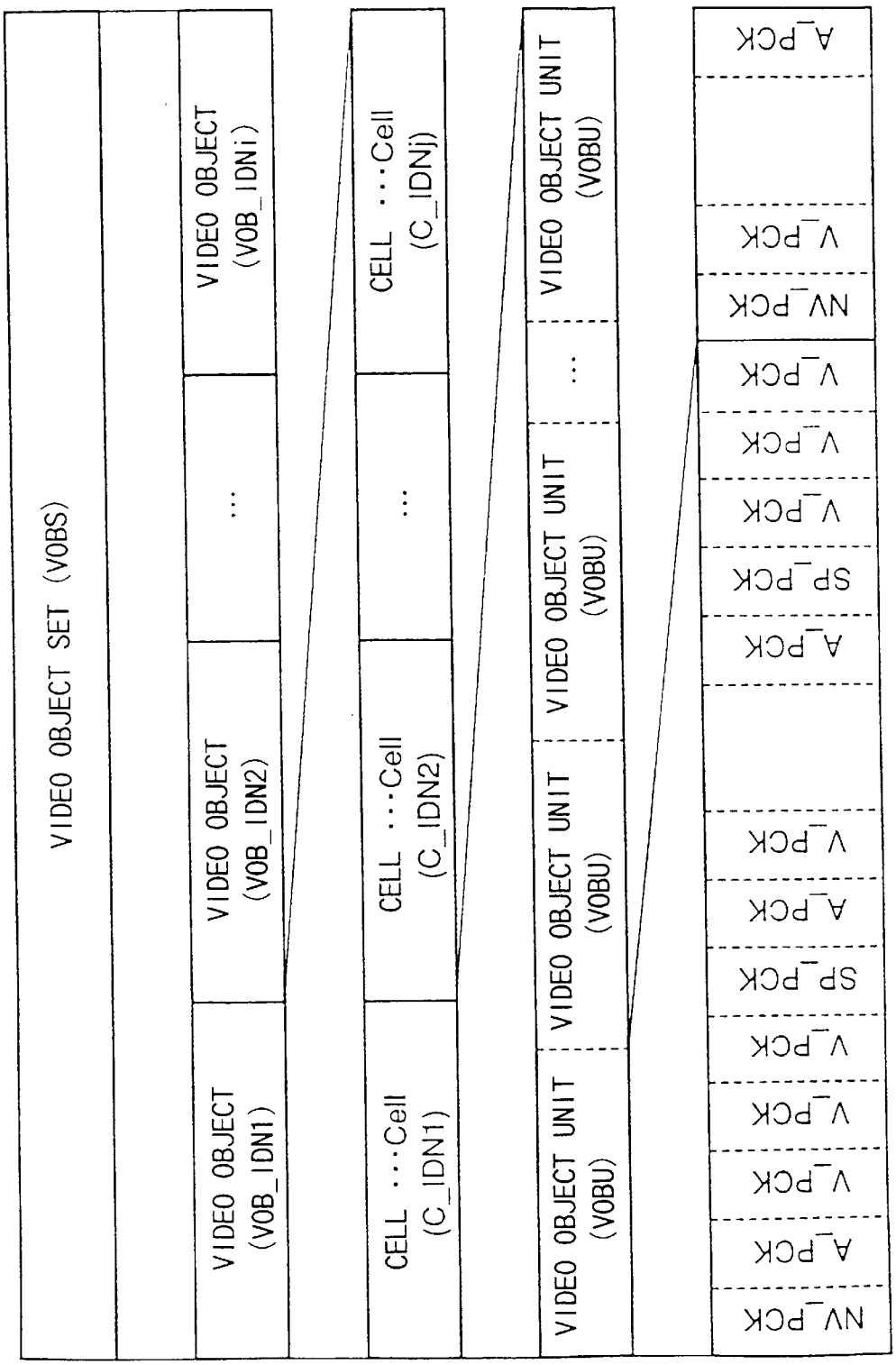
FIG. 17 illustrates a relationship between video object set (VOBS) and cells and further illustrates the contents of the cells hierarchically.

FIG. 17 illustrates a relationship between the video object set (VOBS) and the cells and the contents of the cells hierarchically. When DVD playback processing is performed, video breaks (scene changes, angle changes, story changes, etc.) and special playback are handled in units of cells (Cell), or in units of video object units (VOBU) that are in a layer below the cells, or in units of interleaved units (ILVU).

First, the video object set (VOBS) comprises multiple video objects (VOB_IDN1 to VOB_IDNi). Moreover, one video object comprises multiple cells (C_IDN1 to C_IDNj). Furthermore, one cell (Cell) comprises multiple video object units (VOBU) or interleaved units that are described later. One video object unit (VOBU) comprises one navigation pack (NV_PCK), multiple audio packs (A_PCK), multiple video packs (V_PCK), and multiple subpicture packs (SP_PCK).

The navigation pack (NV_PCK) is mainly used as control data for control of reproduced display of data in the video object unit to which it belongs and control data for search for data in the video object unit.

The video pack (V_PCK) is main video information, which is compressed in accordance with the MPEG standard or the like. The subpicture pack (SP_PCK) is subvideo information having contents that are auxiliary to main video. The audio pack (A_PCK) is sound information.

FIG. 18 shows an example of controlling the order of playback of the cells (Cells) by a program chain (PGC).

As the program chain (PGC), various program chains (PGC#1, PGC#2, PGC#3, . . . ) are prepared so as to allow the order of playback of data cells to be set variously. Therefore, the order of playback of cells will be set by making a choice among the program chains.

An example in which program #1 to program #n described by program chain information (PGCI) are executed is shown. The program shown has the contents to specify a cell specified by (VOB_IDN#s, C_IDN#1) and subsequent cells within the video object set (VOBS) in turn.

The program chain, recorded on the management information recording area of the optical disk, is information that is read prior to the reading of the video title set of the optical disk and then stored in the memory in the system controller. The management information is placed at the beginning of the video manager and each video title set.

Figure 19:
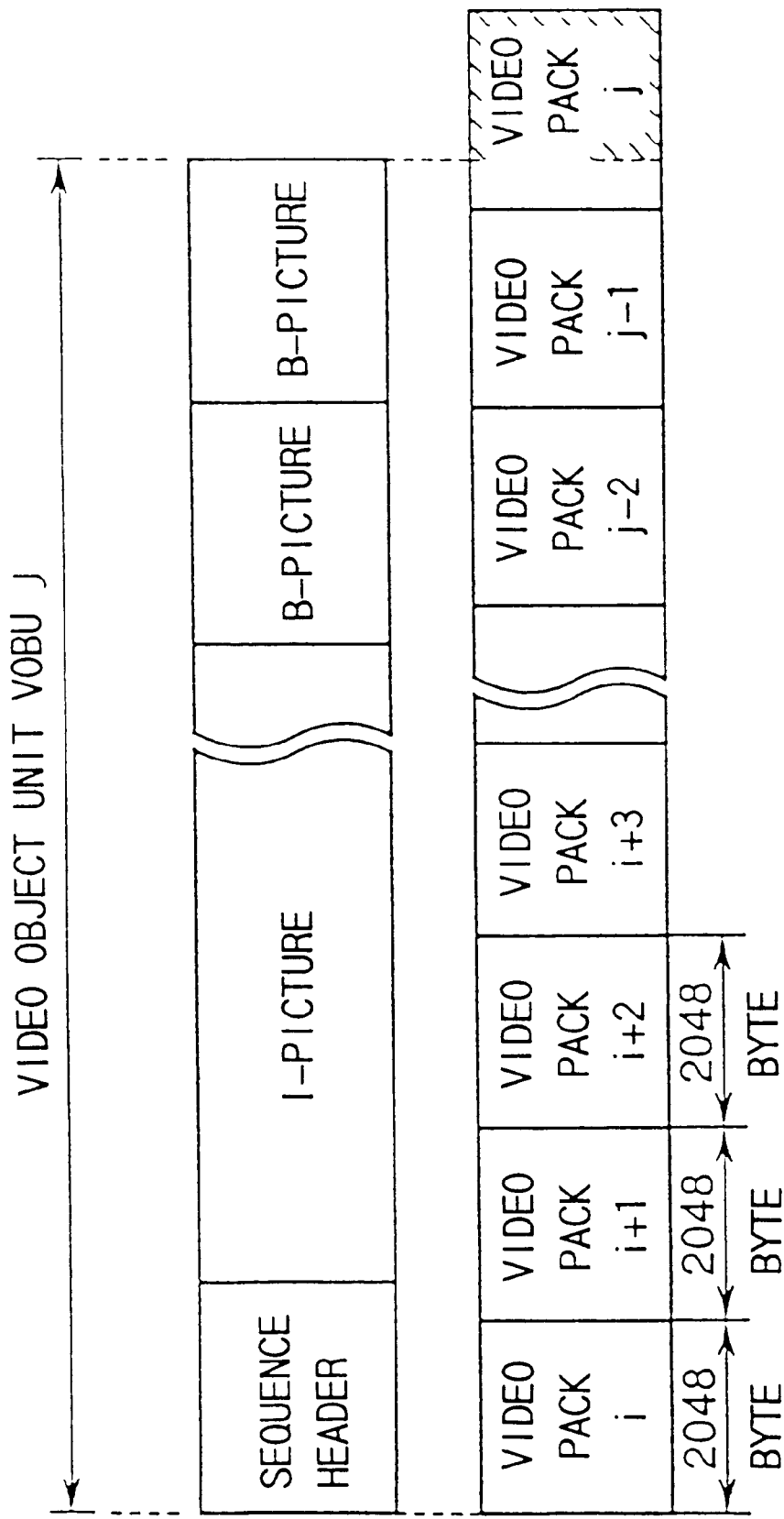
FIG. 19 illustrates a relationship between a video object unit (VOBU) and video packs in the unit.

FIG. 19 shows a relationship between a video object unit (VOBU) and video packs in it. Video data in VOBU comprises one or more GOPs. Encoded video data conforms to ISO/IEC13818-2 by way of example. The GOP in VOBU comprises an I-picture and a B-pictures and the continuation of this data is divided into video packs.

Next, a description is given of a data unit when multi-angle information is recorded and reproduced. When multiple scenes that differ in point of view for a subject are recorded on an optical disk, an interleaved-block portion is built on recording tracks to perform seemless playback. In the interleaved block portion, multiple video objects (VOB) that differ in angle are each divided into multiple interleaved units. As described previously, the interleaved units are recorded in such an arrangement as allows seemless playback.

In the previous description, the multiplexing of multiple stories on a time division basis was described. In the description, all of the divided blocks were termed cells. In the subsequent description, interleaved blocks, in particular, shall be called interleaved units.

FIG. 20 shows an example of an arrangement of interleaved blocks. In this example, 1 to m video objects (VOB) are each divided into n interleaved units and arranged. Each video object (VOB) is divided into an equal number of interleaved units. Thus, this corresponds to the example of FIG. 7 in the previous description.

FIG. 21 shows a recorded state in which, for example, two VOBs, or video objects for angle-1 and angle-2 scenes, are each divided into three interleaved units (ILVU 1-1 to ILVU3-1) (ILVU1-2 to ILVU3-2) and arranged on one track and an example of a reproduced output of the angle 1. In this example, the angle-2 99 information is not captured.

FIG. 22 shows the playback apparatus shown in FIG. 14 in a simplified form. When such jump playback as described above is performed, it is required to supply a decoder 206 with data without interruption. To this end, a track buffer 220 is provided. Vr represents the transfer rate of data sent from an error correcting unit 220 to the track buffer 220, and Vo represents the transfer rate of data sent from the track buffer 220 to the decoder. Data is read from the disk with each error correcting block. One error correcting block corresponds to 16 sectors.

Figure 23:
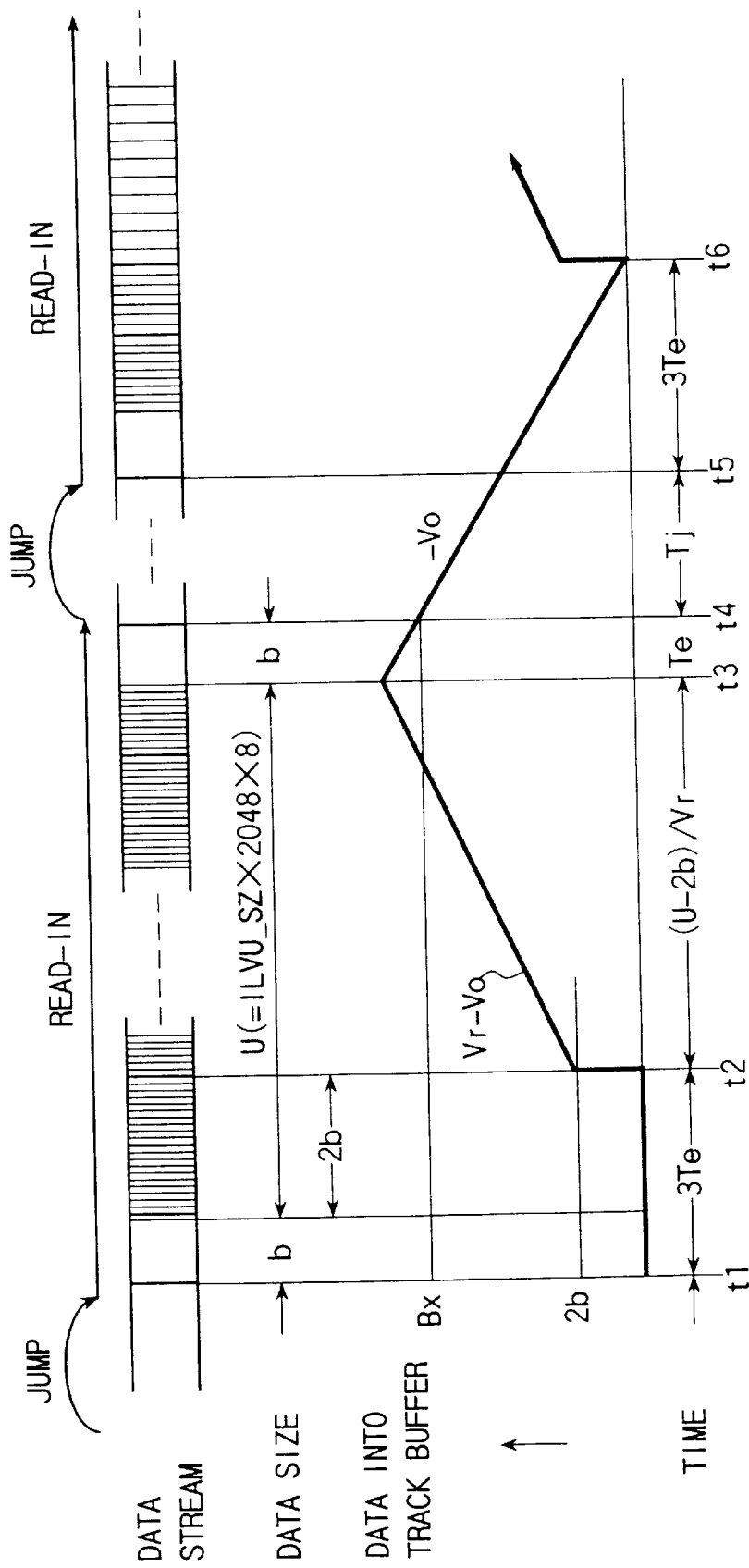
FIG. 23 is a diagram for use in explaining where an increase and a decrease in data entry into the track buffer at the time of playback of interleaved blocks are the worst.

FIG. 23 shows the case where an increase and a decrease in data entered into the buffer when an interleaved block is played back is the worst. In this case, the interleaved unit on the recording track is jumped and the read and playback processing of data in an interleaved unit to which jump is made is carried out.

In the figure, Vr represents the transfer rate of data sent from the error correcting unit 202 to the track buffer 220, and Vo represents the transfer rate of data sent from the track buffer 220 to the decoder.

Tj is the jump time and includes the track seek time and the necessary time incident to the track seek (latency time). b represents the data size of one ECC block (for example, 261114 bits). Te represents the time required to read one ECC block into the buffer. Bx represents the amount of data left in the buffer 220 at the start of the jump (time t4).

The curve indicating the amount of data in FIG. 23 shows that data is stored into the buffer 220 at a storage rate of a gradient of (Vr−Vo) from time t2. Also, the curve shows that the amount of data in the buffer reaches zero at time t6. The data in the buffer decreases at a rate of reduction of gradient −Vo and reaches zero at time t6.

It is the following that can be understood from that curve. That is, the condition that data is continuously output from the buffer 220, or the condition that data is applied to the decoder without interruption is $$Bx \geq Vo \ (Tj+3Te) \tag{2}$$

The condition of the interleaved unit size (ILVU_SZ) that $$ILVU\_SZ \geq \{(Tj \times Vr \times 10^6 + 2b)/(2048 \times 8)\} \times Vo/(Vr-Vo) \tag{3}$$

can be derived.

This expression is equivalent to expression (1) and the number m of interved units is merely eliminated. That is, $$((V0/m)/Pr) - ((V0/m)/Rr) > \sum_{i=1}^{M-1} [(Vi/m)/Jp] \tag{1}$$

(V0/m) in expression (1) corresponds to the size of an interleaved unit, Pr to Vo, and Rr to Vr.

The right-hand side of expression (1) is the jump time. In expression (3), the number of sectors corresponding to the jump time is expressed strictly as $$\{(Tj \times vr \times 10^6 + 2b)/(2048 \times 8)\}.$$

An attempt is made to change expression (1) so that it will be made close to expression (3). By setting (V0/m)=USZ as unit size, Pr=Vo, Rr=Vr, and the right-hand side of equation (1)=Tjp, expression (1) can be changed as follows:

$$USZ \times (1/Vo) - USZ \times (1/Vr) \geq Tjp$$

$$USZ \times \{(1/Vo) - (1/Vr)\} \geq Tjp$$

$$USZ \times \{(Vr-Vo)/(V0 \ Vr)\} \geq Tjp$$

$$USZ \geq Tjp \times Vr \times \{(Vo)/(Vr-Vo)\} \tag{4}$$

Expression (4) has its dimension represented by the amount of data and is in the form in which elements of $10^6$ and 1/(2048×8) in expression (3) are omitted. Tjp corresponds to Tj+2b.

How much capacity is needed for the buffer memory will be investigated next. It is preferable that the capacity of the buffer memory be such that output data of the memory is not interrupted even when the playback apparatus performs a kickback operation and subsequently makes a jump over an interleaved units. The kickback is the state where the pickup waits for reading while the disk makes one rotation and is to shift the reading position to the adjacent track after one rotation of the disk.

Figure 24:
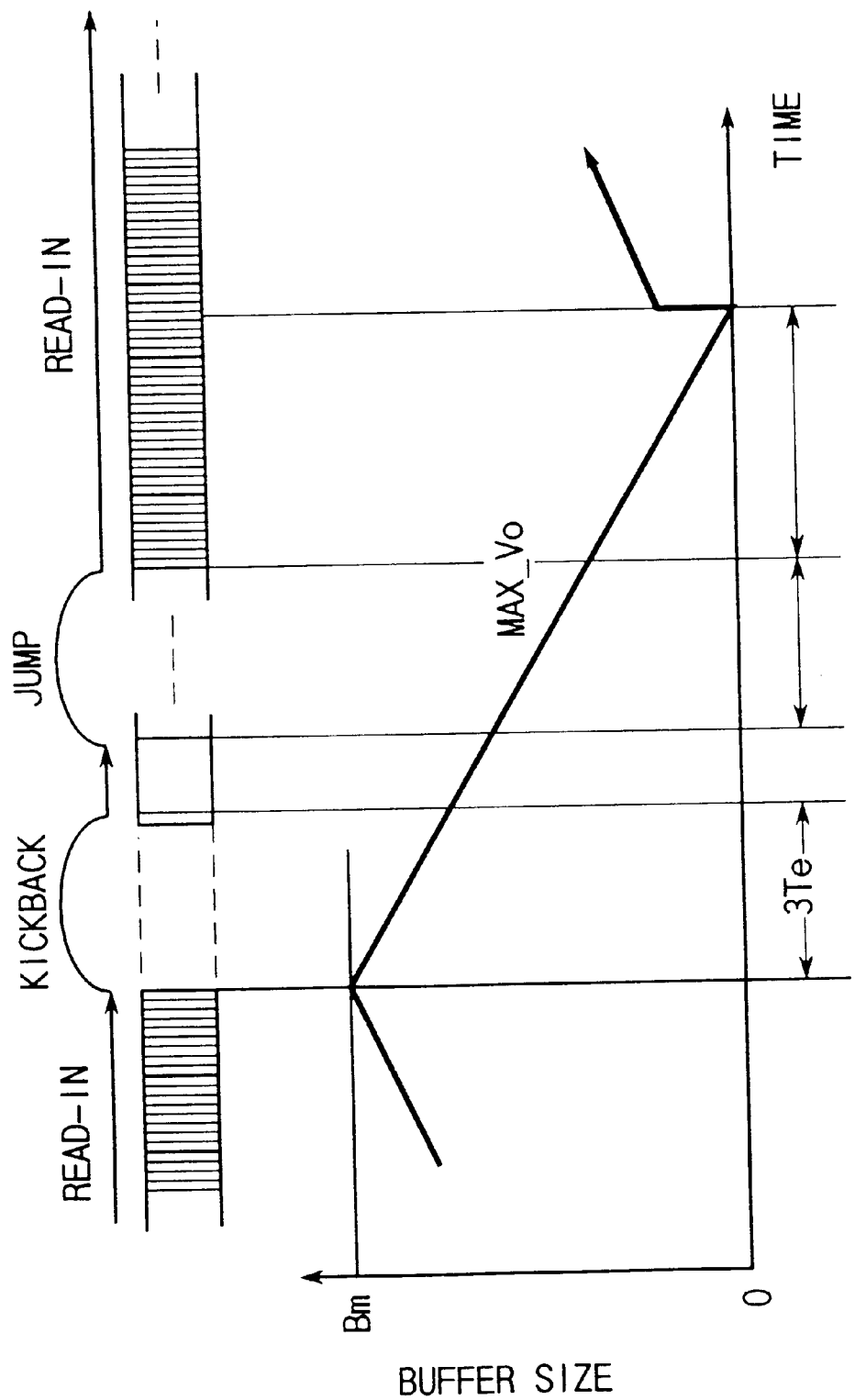
FIG. 24 is a diagram for use in explaining a decrease in data in the buffer memory with time when a kickback operation is performed and a maximum jump is subsequently made in the playback apparatus.

FIG. 24 shows the time when the playback apparatus performs a kickback operation and subsequently performs the maximum jump operation and the state where data in the buffer memory decreases.
Bm=size of the track buffer
Tk=kickback time (corresponding to one rotation time of the disk).
Te=read-in time for one ECC block (24 msec).
Tj=jump time=track seek time (tj)+latency time (=Tk)
MAX_Vo=maximum read-out rate for one LVU The capacity of the buffer memory that ensures the succession of data when the playback apparatus performs a kickback operation and subsequently performs the maximum jump operation is given, in the above condition, by $$Bm \geq \{(2Tk+tj+4Te) \times \text{MAX\_Vo} \times 10^6\}/(2048 \times 8)$$

The unit of Bm is sector, the unit of each of Tk, tj and Te is the second, and the unit of MAX_Vo is the Mbps.

From the above, the track buffer size required depends on Tk, tj and Te of the playback apparatus, and tj depends on the performance of seek operation. Tk and Te depends on the rotational speed of the disk.

FIG. 25 shows examples of designs for the minimum capacity (Bm) of the track buffer, the kickback and seek time, the jump distance, and the amount of data per unit time output from the track buffer in playback apparatus that plays back a digital video disk.

Next, a description will be given of the above-described interleaved units and management information used for playing back the interleaved units.

FIG. 26 shows video title set information (VTSI) in video title set (VTS). A video title set program chain information table (VTS_PGCIT) is described in the video title set information (VTSI). Thus, when a video object set (VOBS) in one video title set (VTS) is played back, a program chain is utilized which is specified by the producer or selected by the user from multiple program chains presented in the video title set program chain information table (VTS_PGCIT).

In the VTSI, the following data are further described.

VTSI_MAT is a video title set information management table, in which the kinds of information present in this video title set and the starting and ending addresses of each item of information are described.

VTS_PTT_SRPT is a video title set part-of-title search pointer table, in which entry points of titles and the like are described.

VTSM_PGCI_UT is a video title set menu program chain information unit table, in which a menu of video title sets is described in various languages. Thus, the menu allows the user to determine what kind of video title set is described and what style of order playback can be performed in.

VTS_TMAPT is a video title set time map table, in which information on the recorded position of each VOBU is described which is managed within each program chain and indicated at regular intervals of seconds.

VTSM_C_ADT is a video tile set menu cell address table, in which the starting and ending address of each cell comprising the video title set menu and the like are described.

VTSM_VOBU_ADMAP is a video title set menu video object unit address map, in which the starting addresses of menu video object units are described.

VTS_C_ADT is a video title set cell address table, in which cell address information is described.

When a program chain is selected in the playback apparatus, the order of playing back cells is set by that chain. In playback, NV_PCK included in the video object unit is referred to.

NV_PCK has information for controlling display contents and display timing and information for data search. Thus, the retrieval and decoding of V_PCK are performed on the basis of information in the NV_PCK table. In addition, another pack is retrieved and decoded, in which case A_PCK and SP_PCK in a language specified by the producer or user are retrieved.

FIG. 27 shows the contents of the video title set program chain information table (VTS_PGCIT). In this table are described video title set PGCI table information (VTS_PGCITI), search pointers (VTS_PGCI_SRP#1 to #n) for video title set program chain information, and specific program chain information (VTS_PGCI).

In (VTS_PGCITI) are described the number of search pointers and the ending address of this table.

In (VTS_PGCI_SRP#1 to #n) are described, as the category of the video tile set program chain, the number of titles in a video title set that becomes a target, whether the program chain ends with one block or continues into a chain in another block, etc. In addition, the starting address of the video title set program chain is described in terms of the relative address to the starting position of this table.

FIG. 28 describes the contents of program chain information (PGCI).

The PGCI contains program chain general information (PGCI_GI), a program chain command table (PGC_CMDT), a program chain program map (PGC_PGMAP), cell playback information (C_PBI), and cell position information table (C_POSIT).

In the PGCI_GI are described the number of programs and the number of cells for this program chain (this information is called PGC contents (PGC_CNT)). In addition, all the playback times that the program chain intends are shown (this information is called PGC playback time (PGC_PB_TM)). Moreover, a code of whether a program played back by this program chain allows user operation, for example, whether the switching of angles is possible, is described (this information is called PGC user operation control (PGC_UPR_CTL)). Furthermore, codes of whether audio streams can be switched and what type of audio stream (e.g., linear PCM, AC-3, MPEG or the like) can be switched into are also described (this information is called PFC audio stream control table (PGC_AST_CTLT)). In addition, codes of whether subvideos can be switched and what type of subvideo (e.g., a different aspect ratio) can be switched into are described (this information is called PGC subvideo stream control table (PGC_SPST_CTLT)).

Moreover, in this PGCI_GI, the next program chain number and the previous program chain number are also described. Furthermore, whether the program intended by this program chain is intended for continuous playback, random playback, or shuffle playback is also described (this information called PGC navigation control (PGC_NV_CTL)). In addition, color specification is performed to indicate what colors subvideo is to be displayed in (this information is called PGC subvideo palette (PGC_SP_PLT)).

Also, the starting address of the program chain command table (PGC_CMDT_SA), the starting address of the program chain program map (PGC_PGMAP_SA), the starting address of the cell playback information table (C_PBIT_SA) and the starting address of cell position information (C_POSI_SA) are described.

In the program chain command table are described the pre-commands and post-commands of the program chain and cell commands. The pre-commands are ones to be processed prior to the execution of the program chain and the post-commands are ones to be processed after the execution of the program chain. The pre-commands and post-commands are used to define the video title, the reproduced state of audio, and the reproduced stream on the basis of commands or parameters decided in advance on the player side or the disk producer side. The cell commands are ones to be processed subsequent to the execution of playback processing of cells.

In the starting address of the program chain program map (PGC_PGMAP), the structure of a program for which the program chain is intended is indicated and entry cell numbers of an existing program are described.

In the cell playback information table (C_PBIT) is described information indicating the order of playing back cells for which the program chain is intended.

Figure 29:
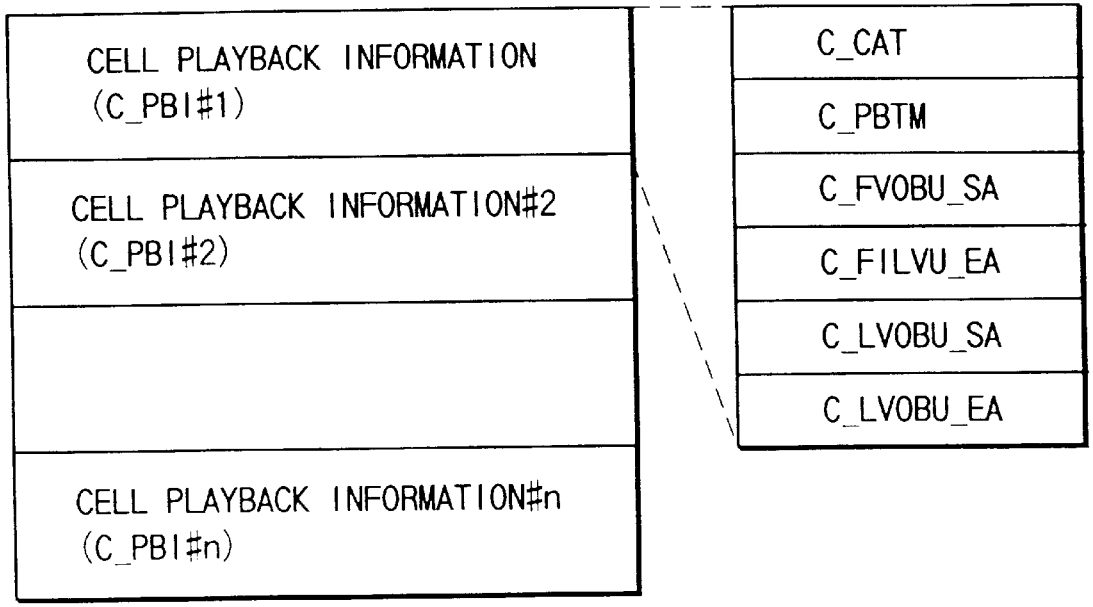
FIG. 29 illustrates cell playback information (C_PBIT) and the contents thereof.

FIG. 29 shows cell playback information (C_PBIT) and its contents. The C_CAT is cell attribute information and indicates the mode of a cell block. The mode of a cell block indicates whether the cell is the first one or the last one. Are also included information as to whether seemless playback is to be performed, information as to whether the cell block is among interleaved blocks, and information about seemless angle switching. The information about seemless angle switching indicates that the angle switching can be made either seemlessly or non-seemlessly.

C_PBTM indicates the cell playback time, C_FVOBU_SA the starting address of the first video object unit (VOBU) of the cell, C_ILVU_EA the ending address of the first interleaved unit (ILVU) of the cell, C_FVOBU_SA the starting address of the last video object unit (VOBU) of the cell, and C_FVOBU_EA the ending address of the last video object unit (VOBU) of the cell. The addresses are described in terms of logical block numbers relative to the first logical block of VOBS to which the cell belongs.

By referring to the cell playback information, a determination can be made of whether the current playback state reaches the end of a cell. When the next cell is played back, the next cell playback information in the cell playback information table is referred to determine the starting address of the first VOBU of the next cell (or interleaved unit).

Figure 30:
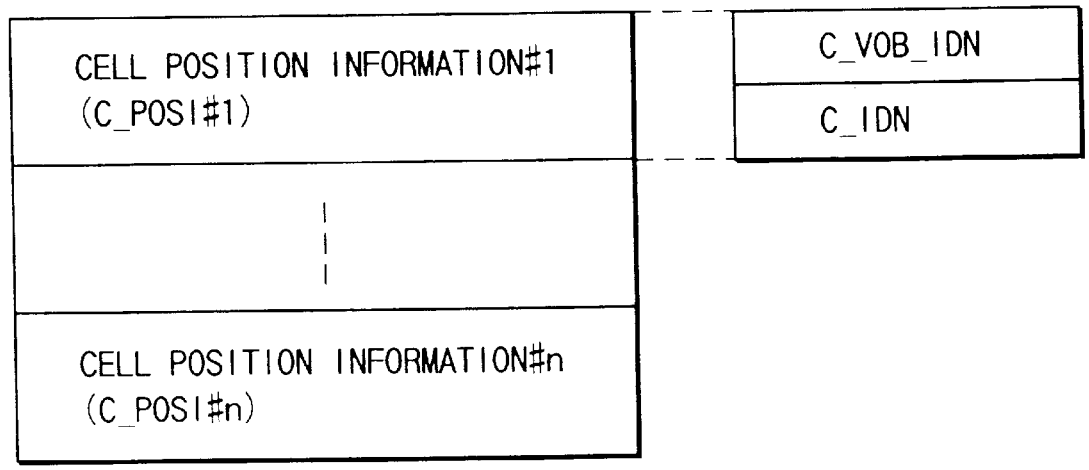
FIG. 30 illustrates the contents of a cell position information table (C_PSIT).

FIG. 30 shows the contents of the cell position information table (C_PSIT). The cell position information includes the ID number of a video object (C_VOB_IDN) in which the cell is contained and the cell ID number (C_IDN) of the cell.

As described above, the management information describes cell playback information, in which there is cell attribute information indicating whether interleaved units for multiple angles or the like have been recorded.

When a multi-angle video or a multi-story video is recorded, the playback apparatus needs to switch from the angle being played back to the other or switch from the story being played back to the other according to user's operation. In this case, the playback apparatus responds to the user's operation on the basis of the following information. First, the structure of a pack will be described.

Figure 31:
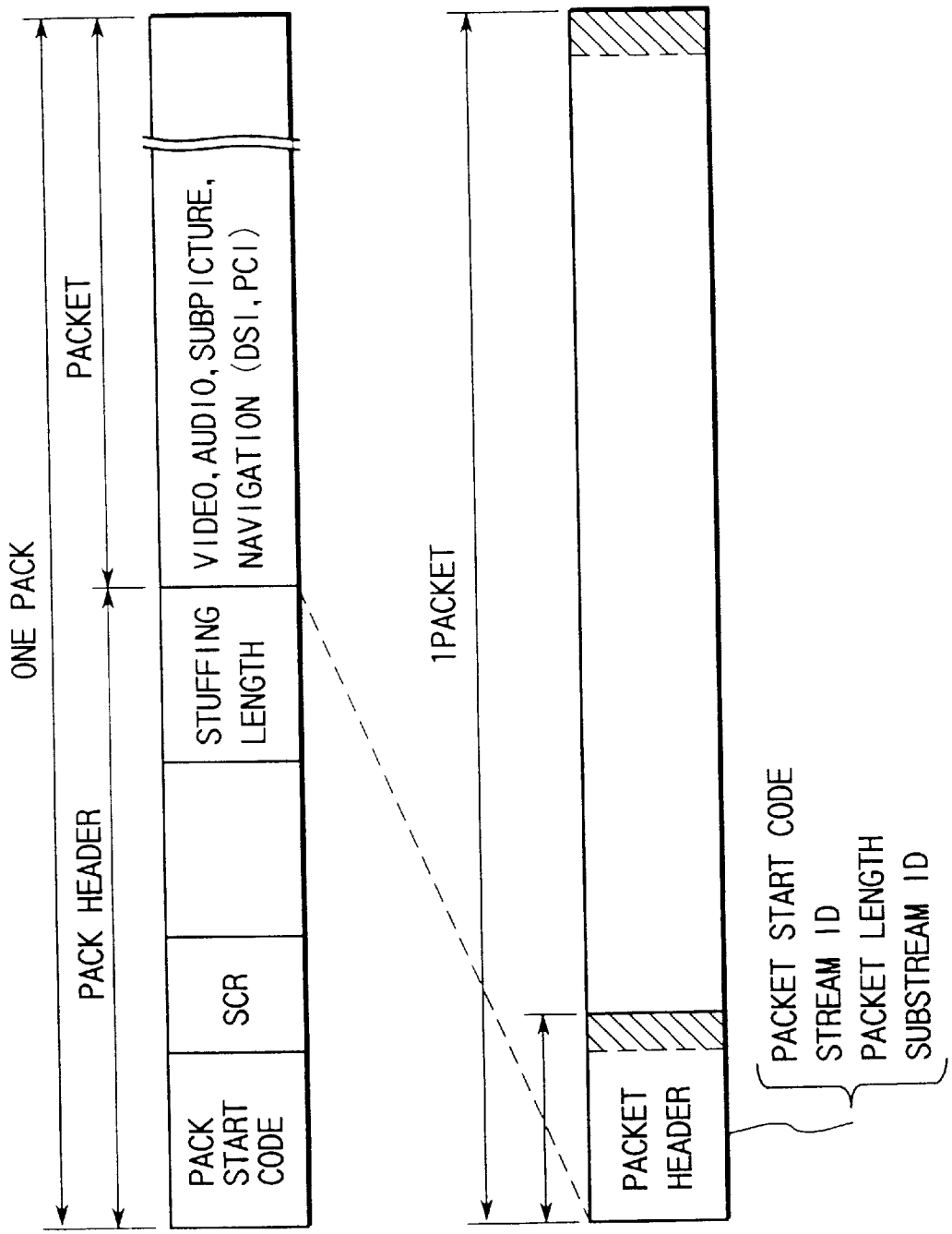
FIG. 31 illustrates the formats of a pack and a packet recorded on an optical disk.

FIG. 31 shows the formats of one pack and one packet. One pack comprises a pack header and a packet. In the packet header are described a pack start code, a system clock reference (SCR), etc. The pack start code is one indicating the beginning of the pack, and the system clock reference (SCR) is information indicating to the entire playback apparatus the reference time in the playback elapsed time. One pack is 2048 bits long and defined and recorded as one logical block on an optical disk.

One packet comprises a packet header and video data or audio data or subpicture data, or navigation data. Stuffing may be provided in the packet header. Padding may be provided in the data division of the packet.

FIG. 32 shows the NV_PCK (see FIG. 17).

The NV_PCK includes a picture control information (PCI) packet basically adapted to control display pictures and a data search information (DSI) packet existing in the same video object. In each packet are described a pack header and a substream ID, followed by data. In each pack header is described a stream ID, indicating NV_PCK. The substream ID is used to distinguish between PCI and DSI. In each pack header are described a packet start code, a stream ID and the packet length, followed by data.

The PCI packet is navigation data for changing display contents synchronously with the playback of video data in a video object unit (VOBU) to which the NV packet belongs.

In the PCI packet are described PCI general information (PCI_GI) that is general information, non-seemless angle information (NSML_ANGLI), highlight information (HLI) and recording information (RECI) that is recorded information.

In the PCI_GI is described PCI general information, which includes: the logical block number (NV_PCK_LBN) that is the address of the navigation pack, the video object unit category (VOBU_CAT) indicating the attribute of a video object unit (VOBU) managed by the PCI, the user operation control (VOBU_UPO_CTL) that is user operation inhibit information in the display period of the video object unit managed by the PCI, the video object unit display starting time (VOBU_S_PTM), and the video object unit display ending time (VOBU_E_PTM). The first picture specified by the VOBU_S_PTM is an I-picture in the MPEG standards. Further, video object unit sequence end presentation time (VOBU_SE_E_PTM) indicating the display time of the last video in the video object unit, the cell elapsed time (C_EITM) indicating the display elapsed time relative to the first video frame in a cell and so on are also described.

The NSML_ANGL indicates the destination address when an angle change is made. That is, the video object unit includes pictures shot from different angles. The address of a VOBU is described to which a transition is made for the next playback when the display of pictures shot from a different angle from the current one is specified by the user.

The HLI is information for specifying a specific rectangular area on the screen and changing the brightness of that area or the color of subvideo displayed therein. The information includes highlight general information (HL_GI), a button color information table (BTN_COLIT) used when the user makes a selection among buttons for color selection, and button information table (BTNIT) for select buttons.

The RECI is information about video, audio and subpicture recorded in the video object unit, each item of information describing what data to be decoded is like. For example, a country code, a copyright owner code and the date of recording are included.

The DSI packet is navigation data for making a search for a video object unit.

In the DSI packet are described DSI general information (DSI_GI), seemless playback information (SML_PBI), seemless angle information (SML_AGLI), video object unit search information (VOBU_SRI), and sync information (SYNCI).

As shown in FIG. 33, in the DSI_GI is described the following information: a system clock reference indicating the reference time for starting decoding the NV_PCK (NV_PCK_SCR), the logical address of the NV_PCK (NV_PCK_LBN), the ending address of the video object unit to which the NV_PCK belongs (VOBU_EA), the ending address of the first reference picture (I-picture) to be decoded first (VOBU_1STREF_EA), the ending address of the second reference picture (P-picture) to be decoded first (VOBU_2NDREF_EA), the ending address of the third reference picture (B-picture) to be decoded first (VQBU_3NDREF_EA), the ID number of the VOB to which the DSI belongs (VOBU_VOB_IDN), the ID number of the cell to which the DSI belongs (VOBU_C_IDN), and the cell elapsed time indicating the elapsed time relative to the first video frame in the cell (C_ELTM).

As shown in FIG. 34, in the SML_PBI is described the following information: video object unit seemless category indicating whether the VOBU to which the DSI belongs is an interleaved unit (ILVU) or a preunit (PREU) that is the criterion for indicating the connection between video objects, the ending address of the interleaved unit (ILVU_EA), the starting address of the next interleaved unit (ILVU_SA), the size of the next interleaved unit (ILVU_SZ), the video display starting time in the video object (VOB) (VOB_V_S_PTM), the video display ending time in the video object (VOB) (VOB_V_E_PTM), the audio stopping time in the video object (VOB) (VOB_A_STP_PTM), and the audio gap length in the video object (VOB) (VOB_A_GAP_LEN). The preunit (PREU) is the last unit in a BOVU immediately before the interleaved unit.

In the video object unit seemless category (VOBU_SML_CAT) are further described a flag indicating whether or not the interleaved unit is one at the starting time and a flag indicating whether the interleaved unit is one at the ending time.

FIG. 35 shows the contents of the seemless angle information (SML_AGLI). C1 to C9 indicate the number of angles. Even if a maximum of nine angles exists, the addresses and sizes of their destination interleaved units can be indicated. That is, the addresses and sizes (SML_AGL_Cn_STA) (n=1 to 9) of interleaved units that are destinations for the respective angles are described. When the user performs an operation of changing the angle while watching video, this operation information is referenced to, thereby allowing the playback apparatus to recognize the playback position of the next interleaved unit.

FIG. 36 shows VOBU search information (VOBU_SRI) which is referenced to at the time of special playback, etc.

The information describes the starting addresses of VOBUs (0.5×n) seconds before and after the starting time of the current video object unit (VOBU). That is, the starting address of each of +1, +20, +60, +120 and +240 VOBUs as forward addresses (FWDINn) and a flag that a video pack is present in the unit are described according to the order of playback with the VOBU containing the DSI being referenced to. The starting address is described in terms of the number of logical sectors relative to the leading logical sector in the VOBU. The use of this information permits VOBUs the user wants to play back to be selected optionally.

FIG. 37 shows sync information. In this sync information are described the address of an object audio pack to be synchronized and the VOBU starting address of an object subvideo pack to be synchronized.

The above-described management information is described on an optical disk. The system controller of the playback system makes a reference to the program chain information in the video manager to thereby acquire cell playback information. By referring to the cell attribute information, whether interleaved unit blocks for multiple angles have been recorded is recognized. When the interleaved unit blocks have been recorded, seemless playback information and seemless angle information in the NV_PACK are acquired and stored in the buffer memory in the middle of playback. When angle switching information is entered by the user, the seemless angle information is referenced to, whereby the playback of interleaved units for the angle specified by the user is started. Then, reference is made to the seemless cell playback information contained in the acquired NV_PAC to recognize the interleaved unit to be played back next. By referencing to the cell playback information, a decision can be made as to whether it is the end of a cell that is currently played back. To play back the next cell, reference is made to the next cell playback information in the cell playback information table to determine the starting address of the first VOBU of the next cell (or interleaved unit).

The system controller 204 of the playback apparatus shown in FIG. 14 is equipped with means for processing various items of management information, program chains, navigation packs, etc., as described above and processing operation inputs from the remote control operating unit 205. Thus, detecting means for detecting cell attribute information, cell playback sequence information and branch scene switching information (angle information and the like) are provided. And reference is made to information stored in the detecting means in response to an operation input to thereby determine an interleaved unit stream to be played back. In this case, by controlling the tracking controller in the pickup unit 103 and the timing of reading of data by the error correcting unit 202, kickback and jump processing is implemented.

The invention can be applied to the manufacture and sale of optical disks in multimedia and the manufacture and sale of optical disk recording and playback apparatuses.

Additional advantages and modifications will readily occur to those skilled in the art. Therefore, the invention in its broader aspects is not limited to the specific details, representative device and illustrated examples shown and described herein. Accordingly, various modifications may be made without departing from the spirit or scope of the general inventive concept as defined by the appended claims and their equivalents.

We claim:

1. An information recording method of recording on a recording medium a multi-scene program having a plurality of optionally selectable branch scenes between a branch point at which a preceding main scene of a video program comprising video, sound or text or any combination of video, sound and text branches off and a connection point for connection to a succeeding main scene in said video program, comprising:

dividing branch scenes into a number m of cells;

arranging cells of the respective branch scenes to be time-division multiplexed; and determining the number of cells, m, such that, supposing that said branch scenes are termed B0, B1, B2, . . . Bi, . . . in the order of decreasing amount of coding, a jump time Tjp between cells in a shortest scene B0 is $$Tjp = \sum_{i=1}^{M-1} [(Vi/m)/Jp]$$

where Vi=amount of coding for Bi, Jp=amount of coding over which jump can be made a unit time, M−1=number of other cells between cells for the shortest scene B0, i=story number, and M=number of stories, and "m" represents the number of cells in each branch story; and a playback time Tp for a unit cell in the shortest scene Bo is represented by $$Tp=(V0/m)/Pr$$

where Pr=maximum playback rate per unit time at which the playback apparatus plays back said branch scenes, V0=amount of coding for B0; and a read time Tr for a unit cell in the shortest scene B0 is represented by $$Tr=(V0/m)/Rr$$

where Rr=read rate of the playback apparatus; and from the condition, Tp−Tr>Tjp, that the jump time required to jump to the next cell is shorter than the playback time, the following expression results:

$$((V0/m)/Pr) - ((V0/m)/Rr) > \sum_{i=1}^{M-1} ((Vi/m)/Jp) \quad (1)$$

where the number, m, of cells in each branch story is set in accordance with expression (1).

2. The information recording method according to claim 1, wherein, in the absence of m that satisfies expression (1), a part of said succeeding main scene is added to each of said branch scenes to create modified branch scene stories, and a new value for m that satisfies expression (1) is obtained using said modified branch stories as B0, B1, B2, . . . Bi, . . .

3. An information playback system comprising:

an information recording/recorded medium in which a multi-scene program having a plurality of optionally selectable branch scenes are recorded between a branch point at which a preceding main scene of a video program made up of video, sound, text and the like branches off and a connection point for connection to a succeeding main scene in said video program, a recorded state between said branch point and said connection point being such that said branch scenes are each divided into multiple cells each corresponding to a predetermined video playback time, the cells of the respective branch scenes being recorded time-division multiplexed, and the cells to be played back successively being arranged within a distance corresponding to a predetermined amount of coding; and a playback apparatus for playing back said information recording medium which is arranged such that the time Ts required to seek said distance corresponding to said predetermined amount of coding and the time Tc required for said playback apparatus to decode one cell by a decoder to obtain a video playback output are related by $$Tc - [(Tc \times Pr)/Rr] > Ts$$

where Rr=amount of coding read per unit time, and Pr=maximum amount of coding dissipated for video playback per unit time.

4. An information playback system comprising:

an information recording medium in which a multi-scene program having a plurality of optionally selectable branch scenes are recorded between a branch point at which a preceding main scene of a video program made up of video and sound and/or text and/or the like branches off and a connection point for connection to a succeeding main scene in said video program, a recorded state between said branch point and aid connection point being such that said branch scenes are each divided into an equal number of interleaved units, the interleaved units of the respective branch scenes being time-division multiplexed, wherein the spacing between two interleaved units to be played back successively is set to a distance corresponding to a predetermined amount of coding or below, and wherein each of said interleaved units comprises a set of multiple sectors each of which is an error correcting code (ECC) block having an error correcting code; and a playback apparatus for playing back said information recording medium comprising an error correcting unit for subjecting said sectors read from said information recording medium to error correction, a track buffer for receiving an output of said error correcting unit, and a decoder for decoding an output of said trick buffer; and wherein the relationship between a size of said interleaved units (ILVU_SZ), a transfer rate of data supplied from said error correcting unit to said track buffer (Vr), a transfer rate of data from said track buffer to said decoder (Vo), a jump time containing the time required for a pickup to seek a track and a necessary time (latency time) incident to track seek (Tj) and a data size (b) of one ECC block is defined by $$ILVU\_SZ \geq \{(Tj \times Vr \times 10^6 + 2b)/(2048 \times 8) \times Vo/(Vr - Vo) \text{ (sectors)}.$$

5. The disk playback system according to claim 4, wherein the size Bm of said track buffer (sectors) is set such that:

$$Bm \geq \{(2Tk + tj + 4Te) \times MAX\_Vo \times 10^6\}/(2048 \times 8)$$

where

Tk=kickback time (sec) (corresponding to one rotation time of disk);

Te=read time (sec) for on ECC block (sector);

Tj=jump time (sec)=track seek time (Tj)+latency time (=Tk); and

MAX_Vo=maximum read-out rate (Mbps) for interleaved unit (ILVU).

6. The playback system according to claim 4, wherein said information recording medium contains recorded attribute information indicating whether said interleaved units have been recorded, sequence information for playing back said interleaved units and branch scene selection switching information, and a controller of said playback apparatus includes detecting means for detecting said attribute information, said sequence information, and said branch scene switching information, and responsive means for responding to an operation input for referencing said attribute information, said sequence information and said branch scene switching information and determining means for determining a stream of interleaved units to be played back.

7. The disk playback system according to claim 6, wherein said branch scenes are multi-angle scenes that are obtained by shooting the same subject from different angles, and said stream determining means is means for switching the angle of playback pictures displayed.

8. The disk playback system according to claim 6, wherein said branch scenes are multiple stories, and said stream determining means is means for switching the story of playback pictures displayed.

* * * * *